(12) United States Patent
Fukui et al.

(10) Patent No.: US 7,611,050 B2
(45) Date of Patent: Nov. 3, 2009

(54) IMAGE PROCESSING SYSTEM INCLUDING PLURALITY OF IMAGE PROCESSING APPARATUSES CONNECTED TO NETWORK FOR USE BY PLURALITY OF USERS, AND IMAGE PROCESSING APPARATUS INCLUDED IN THE IMAGE PROCESSING SYSTEM

(75) Inventors: Kazuyuki Fukui, Toyohashi (JP); Mikio Masui, Kobe (JP); Hiroyuki Ozawa, Kawasaki (JP); Shuichiro Kaneko, Yokohama (JP); Norihisa Takayama, Kobe (JP); Yoshikazu Ikenoue, Itami (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 145 days.

(21) Appl. No.: 11/679,458

(22) Filed: Feb. 27, 2007

(65) Prior Publication Data

US 2007/0208827 A1    Sep. 6, 2007

(30) Foreign Application Priority Data

Mar. 2, 2006   (JP) .............................. 2006-056328

(51) Int. Cl.
*G06K 5/00* (2006.01)
(52) U.S. Cl. .................... 235/380; 235/375; 235/487
(58) Field of Classification Search ................ 235/380, 235/382, 375, 487
See application file for complete search history.

(56) References Cited

U.S. PATENT DOCUMENTS

| 6,246,487 | B1 | 6/2001 | Kobayashi et al. |
| 6,378,070 | B1 | 4/2002 | Chan et al. |
| 6,894,792 | B1 | 5/2005 | Abe |
| 6,978,299 | B1 | 12/2005 | Lodwick |
| 2006/0274360 | A1 | 12/2006 | Fukui et al. |
| 2006/0282466 | A1* | 12/2006 | Yasukaga et al. .......... 707/104.1 |
| 2007/0188811 | A1* | 8/2007 | Terada ........................ 358/2.1 |
| 2007/0214508 | A1* | 9/2007 | Fukui et al. ................... 726/28 |

FOREIGN PATENT DOCUMENTS

| EP | 1 120 701 A1 | 8/2001 |
| JP | 6-062146 A | 3/1994 |

(Continued)

OTHER PUBLICATIONS

Notice of Ground of Rejection in JP 2006-056328 dated Mar. 18, 2008, and Translation thereof.

*Primary Examiner*—Edwyn Labaze
(74) *Attorney, Agent, or Firm*—Buchanan Ingersoll & Rooney PC

(57) ABSTRACT

When user identification information is input, if user data including the input user identification information is stored, an MFP serving as an operation terminal requests an MFP serving as a home terminal specified by the apparatus identification information associated with the accepted user identification information by the user data to transmit the registered user information including the input user identification information and stores the registered user information received in response to the transmission request. Therefore, with a user's simple operation of inputting user identification information at an MFP as an operation terminal, the registered user information is transmitted from an MFP as a home terminal storing the registered user information and is then stored in the MFP as an operation terminal.

10 Claims, 15 Drawing Sheets

FOREIGN PATENT DOCUMENTS

| | | |
|---|---|---|
| JP | 09-160970 | 6/1997 |
| JP | 10-042114 A | 2/1998 |
| JP | 10-187379 A | 7/1998 |
| JP | 10-271160 | 10/1998 |
| JP | 11-170627 | 6/1999 |
| JP | 11-184777 A | 7/1999 |
| JP | 2001-249929 A | 9/2001 |
| JP | 2001-306204 A | 11/2001 |
| JP | 2004-015629 A | 1/2004 |
| JP | 2004-185423 A | 7/2004 |
| JP | 2004-192040 | 7/2004 |
| JP | 2005-020223 A | 1/2005 |
| JP | 2005-039411 | 2/2005 |
| JP | 2005-085202 | 3/2005 |
| JP | 2005-354405 | 12/2005 |

* cited by examiner

Fig. 4A
REGISTERED USER INFORMATION OF MFP 100

| NUMBER | USER IDENTIFICATION INFORMATION | PERSONAL INFORMATION | | | | | DELETION FLAG |
|---|---|---|---|---|---|---|---|
| | | ACCOMPANYING INFORMATION | ADDRESS BOOK | PANEL SETTING INFORMATION | AUTHENTICATION INFORMATION | HISTORY INFORMATION | |
| 1 | DAVID | ACCOMPANYING INFORMATION A | ADDRESS BOOK A | PANEL SETTING INFORMATION A | AUTHENTICATION INFORMATION A | HISTORY INFORMATION A | OFF |

Fig. 4B
REGISTERED USER INFORMATION OF MFP 100A

| NUMBER | USER IDENTIFICATION INFORMATION | PERSONAL INFORMATION | | | | | DELETION FLAG |
|---|---|---|---|---|---|---|---|
| | | ACCOMPANYING INFORMATION | ADDRESS BOOK | PANEL SETTING INFORMATION | AUTHENTICATION INFORMATION | HISTORY INFORMATION | |
| 2 | JULIE | ACCOMPANYING INFORMATION B | ADDRESS BOOK B | PANEL SETTING INFORMATION B | AUTHENTICATION INFORMATION B | HISTORY INFORMATION B | OFF |

Fig. 4C
REGISTERED USER INFORMATION OF MFP 100B

| NUMBER | USER IDENTIFICATION INFORMATION | PERSONAL INFORMATION | | | | | DELETION FLAG |
|---|---|---|---|---|---|---|---|
| | | ACCOMPANYING INFORMATION | ADDRESS BOOK | PANEL SETTING INFORMATION | AUTHENTICATION INFORMATION | HISTORY INFORMATION | |
| 3 | TED | ACCOMPANYING INFORMATION C | ADDRESS BOOK C | PANEL SETTING INFORMATION C | AUTHENTICATION INFORMATION C | HISTORY INFORMATION C | OFF |

Fig. 4D
REGISTERED USER INFORMATION OF MFP 100C

| NUMBER | USER IDENTIFICATION INFORMATION | PERSONAL INFORMATION | | | | | DELETION FLAG |
|---|---|---|---|---|---|---|---|
| | | ACCOMPANYING INFORMATION | ADDRESS BOOK | PANEL SETTING INFORMATION | AUTHENTICATION INFORMATION | HISTORY INFORMATION | |
| 4 | MICHAEL | ACCOMPANYING INFORMATION D | ADDRESS BOOK D | PANEL SETTING INFORMATION D | AUTHENTICATION INFORMATION D | HISTORY INFORMATION D | ON |
| 5 | SUSAN | ACCOMPANYING INFORMATION E | ADDRESS BOOK E | PANEL SETTING INFORMATION E | AUTHENTICATION INFORMATION E | HISTORY INFORMATION E | OFF |

Fig. 4E

USER DATA

| NUMBER | USER IDENTIFICATION INFORMATION | HOME TERMINAL |
|---|---|---|
| 1 | DAVID | IP ADDRESS OF MFP 100 |
| 2 | JULIE | IP ADDRESS OF MFP 100A |
| 3 | TED | IP ADDRESS OF MFP 100B |
| 4 | MICHAEL | IP ADDRESS OF MFP 100C |
| 5 | SUSAN | IP ADDRESS OF MFP 100C |

IMAGE PROCESSING SYSTEM INCLUDING PLURALITY OF IMAGE PROCESSING APPARATUSES CONNECTED TO NETWORK FOR USE BY PLURALITY OF USERS, AND IMAGE PROCESSING APPARATUS INCLUDED IN THE IMAGE PROCESSING SYSTEM

This application is based on Japanese Patent Application No. 2006-56328 filed with Japan Patent Office on Mar. 2, 2006, the entire content of which is hereby incorporated by reference.

BACKGROUND OF THE INVENTION

1. Field of the Invention

The present invention relates to an image processing system and an image processing apparatus included in the same, and more particularly to an image processing system in which a plurality of image processing apparatuses connected to a network are used by a plurality of users, and an image processing apparatus included in the image processing system.

2. Description of the Related Art

Recently, information processing apparatuses such as scanners, printers, and facsimiles are generally connected to a network. Japanese Laid-Open Patent Publication No. 10-187379 discloses a system including a data supply source such as a computer and a copier are connected to each other via a network. The system includes a function of registering a personal box in an image storage portion of the data supply source. In this system, a user stores the generated image information in the personal box, designates this image information at any given time at the copier, and allows the copier to transmit the same for printing.

However, in the system disclosed in Japanese Laid-Open Patent Publication No. 10-187379, a personal box has to be registered in the image storage portion of the data supply source, and when a personal box is to be transferred to another computer, the existing personal box has to be deleted and a new personal box has to be registered. Therefore, the operation is inevitably complicated.

SUMMARY OF THE INVENTION

The present invention is therefore to made in order to solve the aforementioned problem. An object of the present invention is to provide an image processing system capable of readily managing users registered at each of a plurality of image processing apparatuses to use the same.

Another object of the present invention is to provide an image processing apparatus capable of readily managing users registered at each of a plurality of image processing apparatuses to use the same.

In order to achieve the aforementioned object, in accordance with an aspect of the present invention, an image processing system includes a plurality of image processing apparatuses connected to a network. Each of the image processing apparatuses includes: a registered user information storage portion to store registered user information including user identification information for identifying each user; a user identification information input portion to accept an input of user identification information; a registration portion to register the inputted user identification information by storing registered user information including the inputted user identification information to the registered user information storage portion; a user data storage portion to store user data which includes the registered user identification information and apparatus identification information for identifying the image processing apparatus storing the registered user information including the registered user identification information, in association with each other; a registered user information requesting portion to request transmission of the registered user information including the inputted user identification information from the image processing apparatus identified by apparatus identification information associated with the inputted user identification information of user data, when user data including the inputted user identification information is stored in the user data storage portion; and an additionally registration portion to additionally store the registered user information sent from the image processing apparatus to the registered user information storage portion in response to reception of the registered user information.

In accordance with another aspect of the present invention, an image processing apparatus connected to a network includes: a registered user information storage portion to store registered user information including user identification information for identifying each user; a user identification information input portion to accept an input of user identification information; a registration portion to register the inputted user identification information by storing registered user information including the inputted user identification information to the registered user information storage portion; a user data storage portion to store user data which includes the registered user identification information and apparatus identification information for identifying the image processing apparatus storing the registered user information including the registered user identification information, in association with each other; a registered user information requesting portion to request transmission of the registered user information including the inputted user identification information from the image processing apparatus identified by apparatus identification information associated with the inputted user identification information of user data, when user data including the inputted user identification information is stored in the user data storage portion; and an additionally registration portion to additionally store the registered user information sent from the image processing apparatus to the registered user information storage portion in response to reception of the registered user information.

In accordance with the aspect of the present invention, when user data including the accepted user identification information is stored, an image processing apparatus specified by apparatus identification information associated with the accepted user identification information by the user data is requested to transmit the registered user information including the accepted user identification information, and the registered user information received in response to the transmission request is stored. Therefore, with a simple operation of inputting user identification information, registered user information can be received from an image processing apparatus storing the registered user information for storage. As a result, it is possible to provide an image processing system and an image processing apparatus capable of readily managing users registered at each of a plurality of image processing apparatuses to use the same.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 4A shows exemplary registered user information stored in MFP 100.

FIG. 4B shows exemplary registered user information stored in MFP 100A.

FIG. 4C shows exemplary registered user information stored in MFP 100B.

FIG. 4D shows exemplary registered user information stored in MFP 100C.

FIG. 4E is a diagram showing an example of user data.

DESCRIPTION OF THE PREFERRED EMBODIMENTS

Figure 1:
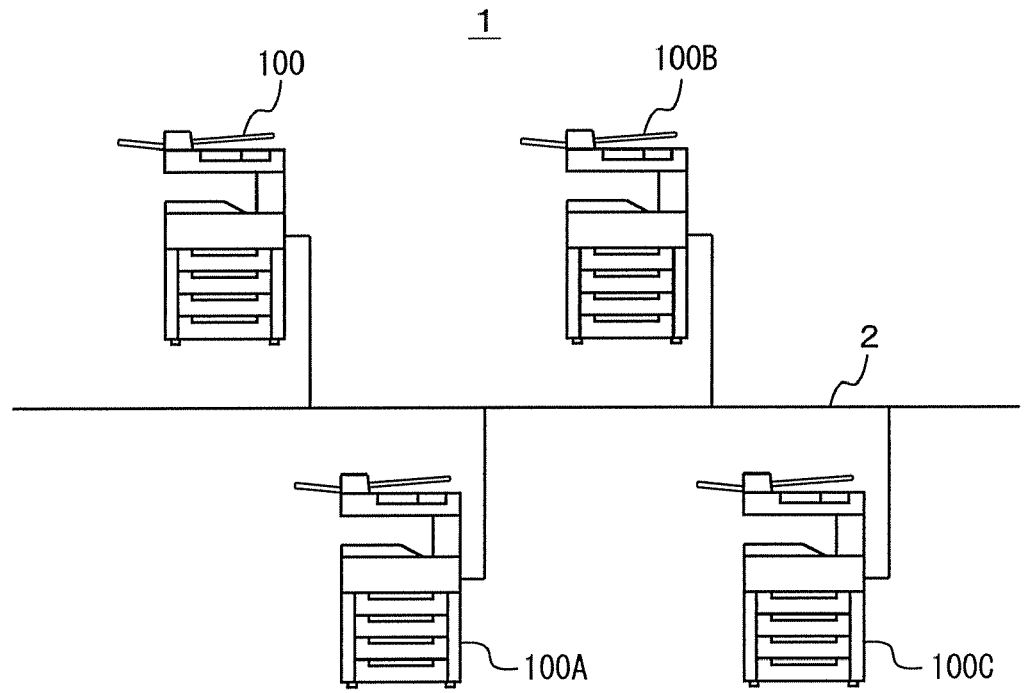
FIG. 1 is an overall schematic diagram showing an image processing system in a first embodiment of the present invention.

The embodiments of the present invention will be described below with reference to the drawings. In the following description, the same or corresponding parts are denoted by the same reference characters. Their names and function are also the same. Thus, a detailed description thereof will not be repeated.

First Embodiment

FIG. 1 is an overall schematic diagram showing an image processing system according to the first embodiment of the present invention. With reference to FIG. 1, an image processing system 1 includes multi function peripherals (referred to as "MFP" below) 100, 100A, 100B, and 100C, each connected to a network 2. The configuration and the function of MFP 100, 100A, 100B, and 100C are the same, and therefore MFP 100 will be described here as an example unless otherwise noted.

MFP (Multi Function Peripheral) 100 includes a scanner for scanning a sheet of original manuscript, an image forming portion for forming an image on recording media such as a sheet of paper based on image data, and a facsimile, and has an image scanning function, a copying function, and a facsimile transmission and reception function. Moreover, although MFP 100 is described as an example in this embodiment, MFP 100 can be replaced by, for instance, a scanner, a printer, a facsimile, a personal computer, and the like.

Network 2 is a local area network (IAN) and the form of connection can be fixed-line or wireless. In addition, network 2 is not limited to a LAN and can be a wide area network (WAN), the Internet, and so on.

Figure 2:
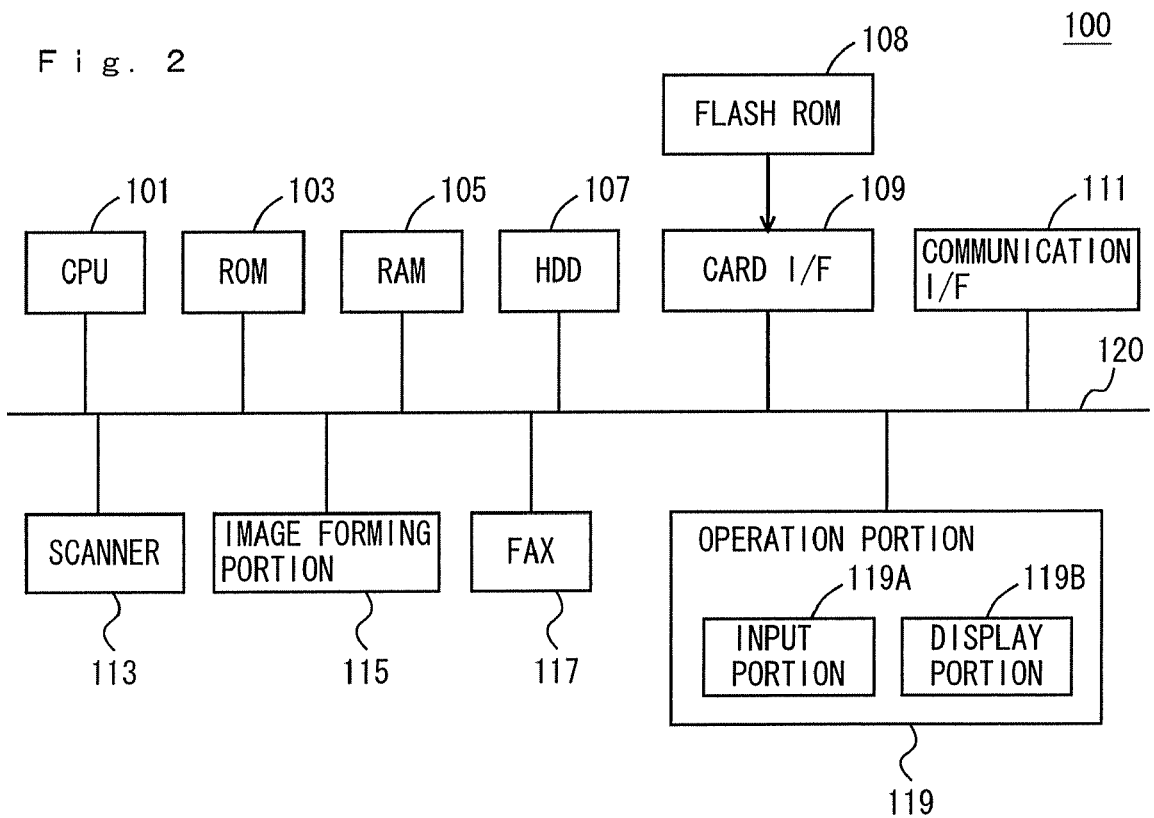
FIG. 2 is a block diagram showing a hardware configuration of MFP.

FIG. 2 is a block diagram showing an exemplary hardware configuration of MFP 100 according to this embodiment. With reference to FIG. 2, MFP 100 includes, each connected to a bus 120, a central processing unit (CPU) 101, a ROM (Read Only Memory) 103 that stores a program or the like to be executed by CPU 101, a RAM (Random Access Memory) 105 for loading a program to be executed and for storing data during execution of the program, a hard disk drive (HDD) 107 for storing data in a nonvolatile manner, a card interface (I/F) 109 to which a flash ROM 108 is attached, a communication I/F 111 for connecting MFP 100 to network 2, a scanner 113, an image forming portion 115, a facsimile (FAX) 117, and an operation portion 119 as an interface with a user.

CPU 101 loads into RAM 105 and executes a user registration program stored in flash ROM 108 attached to card I/F 109. Moreover, the program executed by CPU 101 is not limited to the user registration program stored in flash ROM 108, and a program stored in an EEPROM (Electrically Erasable/Programmable Read Only Memory) connected additionally to CPU 101 can be loaded into RAM 105 and be executed. The use of an EEPROM makes it possible to rewrite or additionally write a user registration program. Thus, another computer connected to network 2 can rewrite the user registration program stored in the EEPROM of MFP 100 or additionally write a new user registration program into the EEPROM. Furthermore, MFP 100 can download a user registration program from another computer connected to network 2 and store the user registration program in an EEPROM.

Moreover, these programs may not always be read from flash ROM 108 for execution. The program stored in ROM 103 may be read. A program read from flash ROM 108 can be stored in an EEPROM connected to CPU 101 and that program can then be read and executed. Furthermore, by saving a user registration program stored in the flash ROM into HDD 107 first, the program can be loaded from HDD 107 into RAM 105 and be executed.

The program referred to here not only includes a program directly executable by CPU 101, but also a source program, a compressed program, an encrypted program, and the like.

Image forming portion 115 is a laser printer, an ink jet printer, or the like, and makes image data visible on recording media such as a sheet of paper. Scanner 113 includes a photoelectric transducer such as a CCD (Charge Coupled Device) and the like, and optically reads a sheet of original manuscript and outputs electronic data that is the image data. FAX 117 transmits and receives the image data according to the facsimile protocol via Public Switched Telephone Network (PSTN).

Operation portion 119 includes an input portion 119A and a display portion 119B. Input portion 119A is an input device such as a touch panel, a keyboard, or a mouse for accepting an input of operation by a user of MFP 100. Display portion 119B is a liquid crystal display or an organic EL, (Electro- Luminescence) display panel. When using a touch panel formed of a transparent member for input portion 119A, the touch panel is provided to overlap display portion 119B so that an instruction to a button displayed on display portion 119B can be detected. Thus, input of a variety of operations can be accepted.

Communication I/F 111 is a communication interface for connecting MFP 100 to network 2. MFP 100 can communicate with other MFPs 100A, 100B, 100C. Although MFP 100 is connected to other MFPs 100A, 100B, and 100C via network 2, it can also be connected directly using a serial interface or a parallel interface. Communication I/F 111 uses an interface that corresponds to the form of connection between MFP 100 and other MFPs 100A, 100B, and 100C.

The input of data into MFP 100 includes the following cases: (1) when scanner 113 scans a sheet of original manuscript and the image data is input; (2) when image data is received from another computer or from other MFPs 100A, 100B, and 100C connected to network 2 via communication I/F; (3) when image data stored in flash ROM 108 is read via card I/F; and (4) when facsimile data is received in FAX 117.

The output of data from MFP 100 includes the following cases: (1) data is made visible on recording media such as a sheet of paper by image forming portion 115; (2) data is transmitted to another computer or to other MFPs 100A, 100B, and 100C connected to the network via communication I/F 111; (3) data is stored in flash ROM 108; (4) data is output as facsimile data by FAX 117; and (5) data is displayed on display portion 119B.

Moreover, a storage medium that stores a user registration program is not limited to flash ROM 108 and can also be media such as a flexible disk, a cassette tape, an optical disk (MO (Magnetic Optical Disc)/MD (Mini Disc)/DVD (Digital Versatile Disc)), an IC card (including a memory card), an optical card, and a semiconductor memory such as a mask ROM, an EPROM, an EEPROM.

In image processing system 1 according to this embodiment, for each of MFPs 100, 100A, 100B, and 100C, a user who mainly uses the apparatus is fixed. Thus, each of MFPs 100, 100A, 100B, and 100C stores registered user information in order to register the user who mainly uses it. The registered user information, which will be described later, includes at least user identification information for identifying a user. The name of the user can be used as the user identification information. Here, based on the user, any one or more of MFPs 100, 100A, 100B, and 100C which store the registered user information of that user are referred to as "home terminals." For instance, if the registered user information of the user "David" is stored in MFP 100, a home terminal of the user "David" is MFP 100. Moreover, registered user information is stored in each of MFPs 100, 100A, 100B, and 100C to define a user who mainly uses the apparatus but not to prohibit the user whose registered user information is not stored therein from using it.

Here, it is assumed that MFP 100 is newly connected to network 2 where MFPs 100A, 100B, and 100C have already been connected thereto. For MFP 100, it is necessary to set apparatus identification information for identifying MFP 100 and the above-described registered user information. When the apparatus identification information and the registered user information are set for MFP 100, MFP 100 transmits the apparatus identification information and the registered user information to other MFPs 100A, 100B, and 100C. Thus, image processing system 1 is formed in MFPs 100, 100A, 100B, and 100C.

Figure 3A:
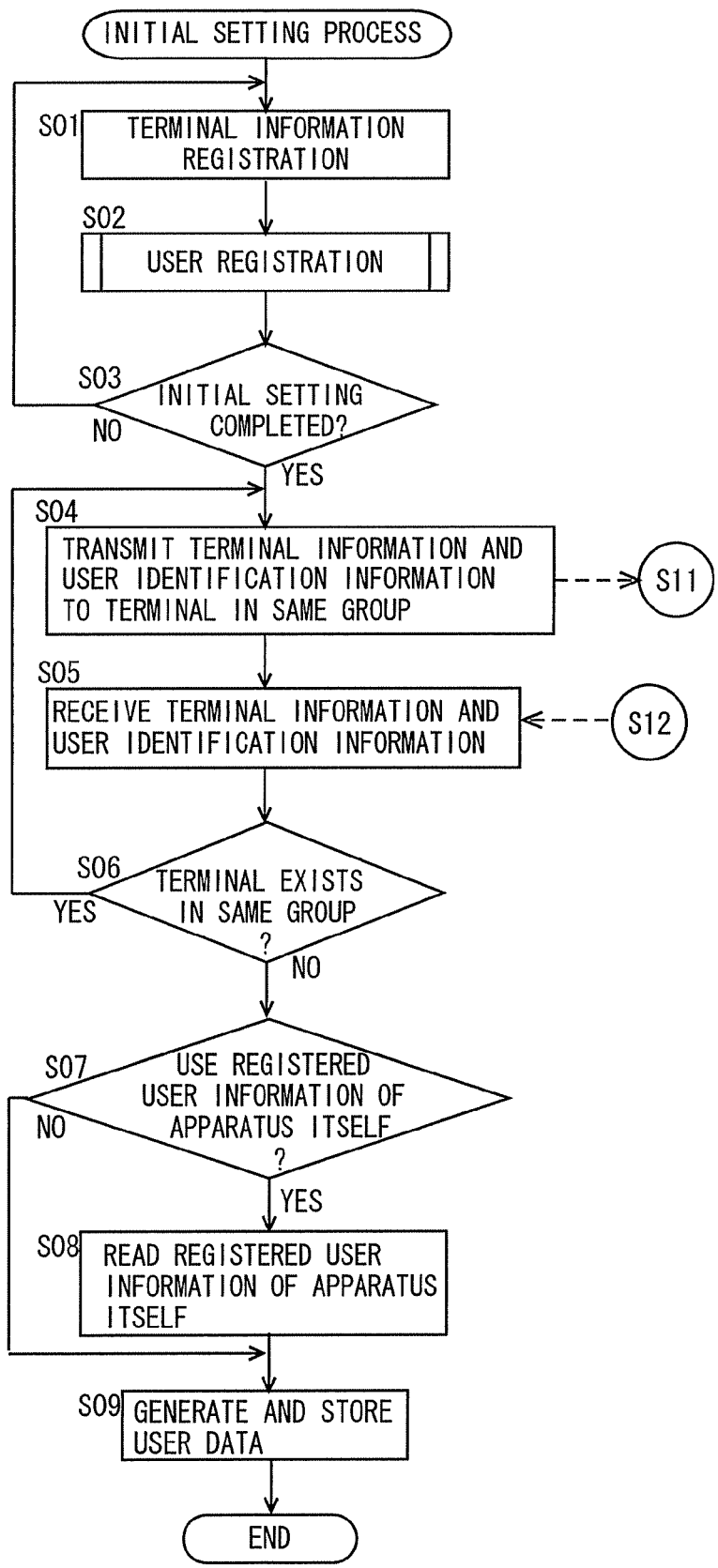
FIG. 3A is a flowchart illustrating an exemplary flow of an initial setting process.
Figure 3B:
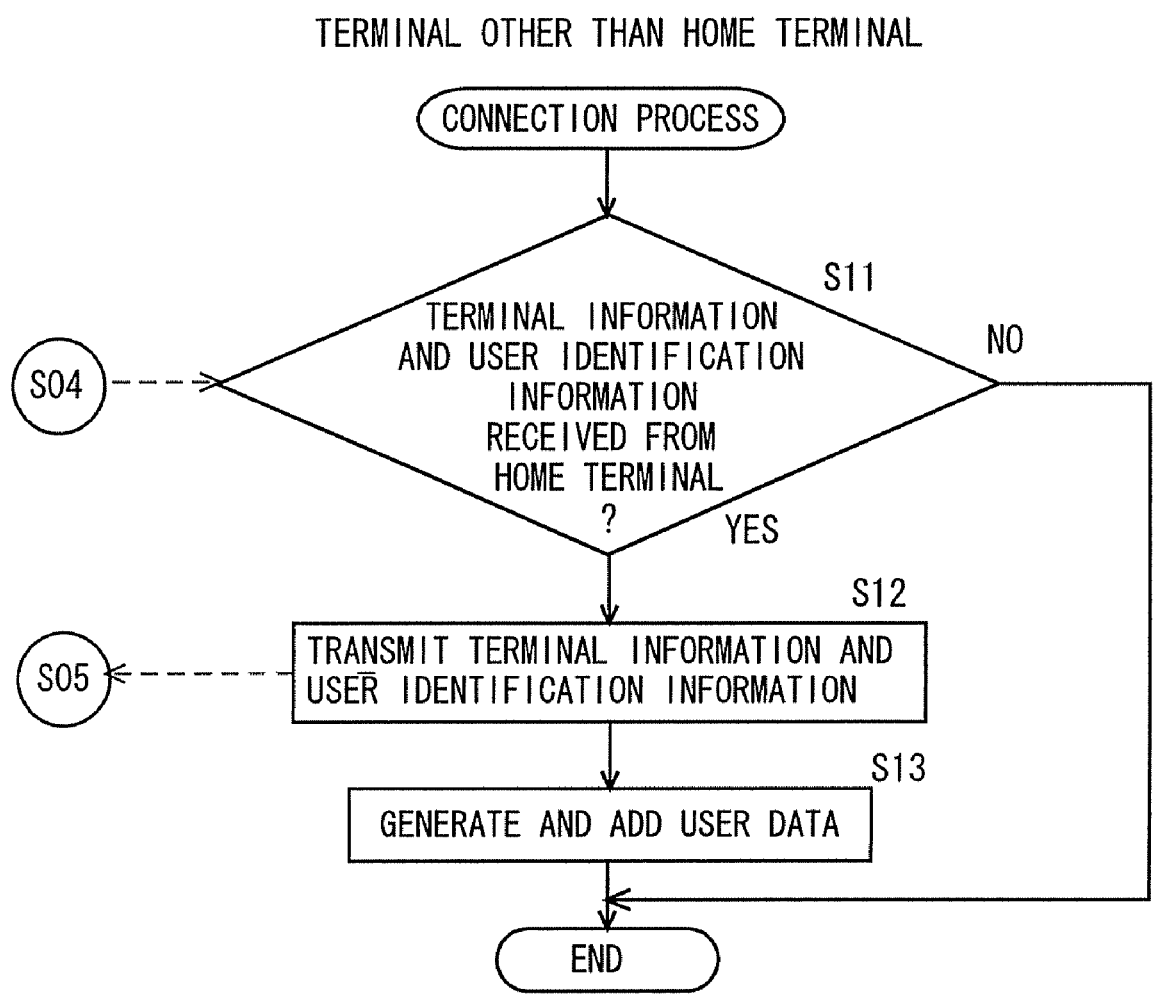
FIG. 3B is a flowchart illustrating an exemplary flow of a connection process.

FIG. 3A is a flowchart illustrating an exemplary flow of an initial setting process. The initial setting process is executed in MFP 100 when MFP 100 is newly connected to the network. FIG. 3B is a flowchart illustrating an exemplary flow of a connection process. The connection process is executed in each of MFPs 100A, 100B, and 100C when MFP 100 is newly connected to network 2. The initial setting process and the connection process are implemented by having an initial setting program and a connection program that are stored in flash ROM 108 loaded into RAM 105 and executed by CPU 101, in each of MFPs 100, 100A, 100B, and 100C. The initial setting program and the connection program are part of the user registration program.

With reference to FIG. 3A, terminal information is registered in MFP 100 (step S01). The terminal information is accepted by MFP 100 and registered by the user inputting the terminal information to operation portion 119 according to a terminal registration window appearing on display portion 119B. The terminal information at least includes apparatus identification information for identifying MFP 100. The apparatus identification information is preferably location information assigned to MFP 100 in network 2, and is here an IP (Internet Protocol) address. The terminal information can include information showing the location where MFP 100 is disposed. At step S01, the terminal information is preferably registered by an administrator of the terminal.

Next, a user registration process is performed for registering a user who uses MFP 100 as a home terminal in MFP 100 (step S02). The user registration process, which will be detailed later, is a process of accepting and storing an input of registered user information corresponding to a user in order to register the user who uses MFP 100 as a home terminal. When a plurality of users use MFP 100 as a home terminal, respective registered user information of a plurality of users are stored in order to register each of a plurality of users. The registered user information at least includes user identification information for identifying the user. The user identification information needs only to be unique information such as a user ID including characters or symbols and a name of the user. Here, a user name is used as the user identification information. The registered user information can also include personal information in addition to user identification information. The personal information is information related to the user and includes accompanying information, an address book, panel setting information, authentication information, and history information.

The user inputs the terminal information, and upon completion of the user registration process, the user gives an instruction to input portion 119A on a completion button displayed on display portion 119B, so that it is detected in MFP 100 that the initial setting has been completed. The registration of the terminal information at step S01 and the user registration process at step S02 are usually performed by the administrator of the terminal.

Then, it is determined whether the initial setting is completed or not (step S03). If the initial setting is completed, the process proceeds to step S04, and if it is not completed, the process goes back to step S01. At step S04, the terminal information and the registered user information for which initial setting has already been performed are transmitted to the terminals in the same group. The same group refers to a set of terminals which form image processing system 1. Here, MFPs 100, 100A, 100B, and 100C connected to network 2 are considered to be of the same group. Thus, by transmitting an inquiry by broadcast on network 2, MFP 100 receives the IP addresses of terminals respectively transmitted back from MFPs 100A, 100B, and 100C in the same group in response to the inquiry. In this manner, the IP addresses of the terminals that form the same group are obtained. Moreover, by grouping, a plurality of terminals connected to network 2 can be divided into different groups. For instance, MFPs 100 and 100A can form one group, while MFPs 100B and 100C can form another group. Such grouping is set by a user. More specifically, as described above, MFP 100 receives the respective IP addresses of MFPs 100A, 100B, and 100C connected to network 2 and detects MFPs 100A, 100B, and 100C, and the user designates which of MFPs 100A, 100B, and 100C should be in the same group as MFP 100, whereby an apparatus to be included in the group is specified.

MFP 100 transmits terminal information and user identification information to one terminal chosen from MFPs 100A, 100B, and 100C set as the same group. Here, MFP 100A is selected, and the terminal information and the user identification information of MFP 100 are transmitted from MFP 100 to MFP 100A, by way of example.

Now, with reference to FIG. 3B, MFP 100A receives the terminal information and the user identification information of MFP 100 transmitted from MFP 100 (step S11). In response to this reception, MFP 100A transmits to MFP 100 the user identification information and the terminal information stored in HDD 107 of MFP 100A (step S12). In the next step S13, user data is generated based on the terminal information and the user identification information of MFP 100 received at step S11, and the generated user data is added to user data already stored in HDD 107.

Here, when MFP 100 executes step S04 to transmit terminal information and user identification information, this transmission is to request MFP 100A to transmit terminal information and user identification information stored by MFP 100A. In addition to transmission of terminal information and user identification information, at step S04, MFP 100 may send to MFP 100A a signal requesting transmission of terminal information and user identification information stored in HDD 107 by MFP 100A. In this case, at step S11, MFP 100A receives a signal to request transmission of terminal information and user identification information and in response, MFP 100A transmits to MFP 100 the terminal information and the user identification information stored in HDD 107 (step S12).

Going back to FIG. 3A, MFP 100 receives the terminal information and the user identification information of MFP 100A transmitted from MFP 100A (step S05). Then, it is determined whether or not a terminal to which the terminal information and the user identification information have not yet been transmitted exists among the terminals of the same group (step S06). If such a terminal exists, that terminal is selected and the process goes back to step S04, but if not, the process proceeds to step S07. Here, since the terminal information and the user identification information have not yet been transmitted to MFPs 100B and 100C, either of these two is selected and the process goes back to step S04. Thus, MFP 100 transmits the terminal information and the user identification information of MFP 100 to the terminals of the same group one by one (step S04), and receives from each terminal the terminal information and the user identification information of that terminal (step S05). Moreover, although, here, the terminals of the same group are selected one by one and the terminal information and the user identification information are transmitted accordingly, the terminal information and the user identification information can be transmitted by broadcast, and the terminal information and the user identification information stored in MFPs 100A, 100B, and 100C can be received from MFPs 100A, 100B, and 100C, respectively.

At step S07, it is determined whether or not the registered user information of the apparatus itself is to be used for the user data generation. This determination can be based on a selection made by a user, or it can be predetermined. If it is determined that the registered user information of the apparatus itself is to be used, the process proceeds to step S08, and if it is determined that it is not to be used, step S08 is skipped and the process proceeds to step S09. At step S08, the registered user information stored in MFP 100 is read. Then, at step S09, the user data is generated from the terminal information and the user identification information. If step S08 is skipped, user data is generated from the user identification information and the terminal information received from each of terminal MFPs 100A, 100B, 100C. If step S08 is executed, user data is generated from the user identification information received from each of MFPs 100A, 100B, 100C and the user identification information stored in the registered user information stored in MFP 100 and the terminal information of each of MFPs 100, 100A, 100B, 100C. Therefore, the same user data is stored in all of MFPs 100, 100A, 100B, 100C. The user data includes the terminal information and the user identification information.

Here, the user data generated when MFP 100 determines that the registered user information of its own is used at step S07 is referred to as first user data, and the user data generated when MFP 100 determines that the registered user information of its own is not used at step S07 is referred to as second user data. In the following description, MFP 100 generates and stores the second user data, by way of example.

Moreover, here, while the terminal information registration process and the registered user information input process are performed in the initial setting process executed in MFP 100, a process similar to this initial setting process is executed in the case where MFP 100 has already been connected to network 2 and a user is to be added. In such a case, however, the terminal information registration process at step S01 is not required.

In addition, the initial setting process can be performed not only when each of MFPs 100, 100A, 100B, and 100C is connected to network 2 but also after the power is turned on in each of MFPs 100, 100A, 100B, and 100C, or at prescribed time intervals, or every time the user registration process of newly registering a user is executed. For instance, when a user is newly registered in MFP 100, the user identification information of the newly registered user is transmitted to other MFPs 100A, 100B, 100C so that the latest user data is stored in other MFPs 100A, 100B, 100C. In this case, without executing steps S01 and S03 of the initial setting process shown in FIG. 3A, MFP 100 performs the user registration process at step S02. Accordingly, MFP 100 obtains the registered user information of the user newly registered in any other MFP 100A, 100B, 100C, conversely, in order to store the latest user data in MFP 100. In this case, without executing the process at steps S01 to S03 of the initial setting process shown in FIG. 3A, MFP 100 executes a process of requesting transmission of the user identification information from other MFPs 100A, 100B, 100C. This transmission request for the user identification information at least includes apparatus identification information. In response to this transmission request, each of other MFPs 100A, 100B, and 100C executes the connection process shown in FIG. 3B, and at step S11 in response to the transmission request being received, transmits the registered user information stored in its HDD 107 to MFP 100 that transmitted the transmission request. Thus, even when the registered user information stored in HDDs 107 of other MFPs 100A, 100B, and 100C is altered, user data will be generated from the altered registered user information and stored in HDD 107. In this case, each of MFPs 100A, 100B, 100C needs not execute step S13 in the connection process.

FIG. 4A is a diagram showing an example of registered user information stored in MFP 100, FIG. 4B is a diagram showing an example of registered user information stored in MFP 100A, FIG. 4C is a diagram showing an example of registered user information stored in MFP 100B, and FIG. 4D is a diagram showing an example of registered user information stored in MFP 100C.

Referring to FIGS. 4A-4D, the registered user information includes a number, user identification information, personal information, and a deletion flag. The personal information includes accompanying information, an address book, panel setting information, authentication information, and history information. The accompanying information is the information unique to a user, such as the name of the division the user belongs to, an email address assigned to that user, face image data obtained by capturing the face of that user, and so on. The address book is information registered by the user, including information of senders that the user can communicate with, for example, user identification information, an email address, a facsimile number of the user as a transmission destination. The panel setting information is information of the display content on screen individually set by the user. The authentication information is the information used for authentication of the user at log-in, and here, a password is used. It is also possible to use the face image data as the authentication information. When biometrics authentication is used, a fingerprint, sound spectrogram, iris, vein pattern, and the like are used for authentication information. The history information is data generated when the user instructs each of MFPs 100, 100A, 100B, 100C to execute a process, and includes the content of the instruction and the process result. The content of the instruction includes, if it is an instruction of an email transmission process, indication of email transmission, a transmission destination and transmission contents. The deletion flag indicates that registration of the registered user is to be cancelled. In image processing system in the present embodiment, if a home terminal in which a user is registered is changed, the registered user information is not immediately deleted from the home terminal before change but is deleted only after the registered user information is recorded in the home terminal after change. Therefore, while the home terminal before change stores the registered user information until the user is registered in the home terminal after change, the deletion flag of the registered user information is set ON to indicate that the registered user information is stored in the home terminal to be changed. The deletion flag is set ON by a user of the home terminal, for example, by the administrator of the home terminal.

FIG. 4E is a diagram showing an example of user data. This user data is generated in each of MFPs 100, 100A, 100B, 100C and stored therein by MFP 100 executing the initial setting process shown in FIG. 3A and each of MFPs 100A, 100B, 100C executing the connection process shown in FIG. 3B. Referring to FIG. 4E, the user data includes user identification information, personal information, apparatus identification information for identifying the home terminal for the user, and a deletion flag.

In this manner, when the initial setting process is executed in MFP 100, in MFPs 100, 100A, 100B, and 100C set to be of the same group, the same user data is generated and stored. Thus, image processing system 1 constructed by MFPs 100, 100A, 100B, and 100C is formed. When image processing system 1 is formed, the user who uses one of MFPs 100, 100A, 100B, and 100C as a home terminal can be specified based on the user data. Therefore, when a user operates a terminal other than the home terminal using the user data, the personal information recorded in the home terminal can be taken in to that terminal.

Figure 5:
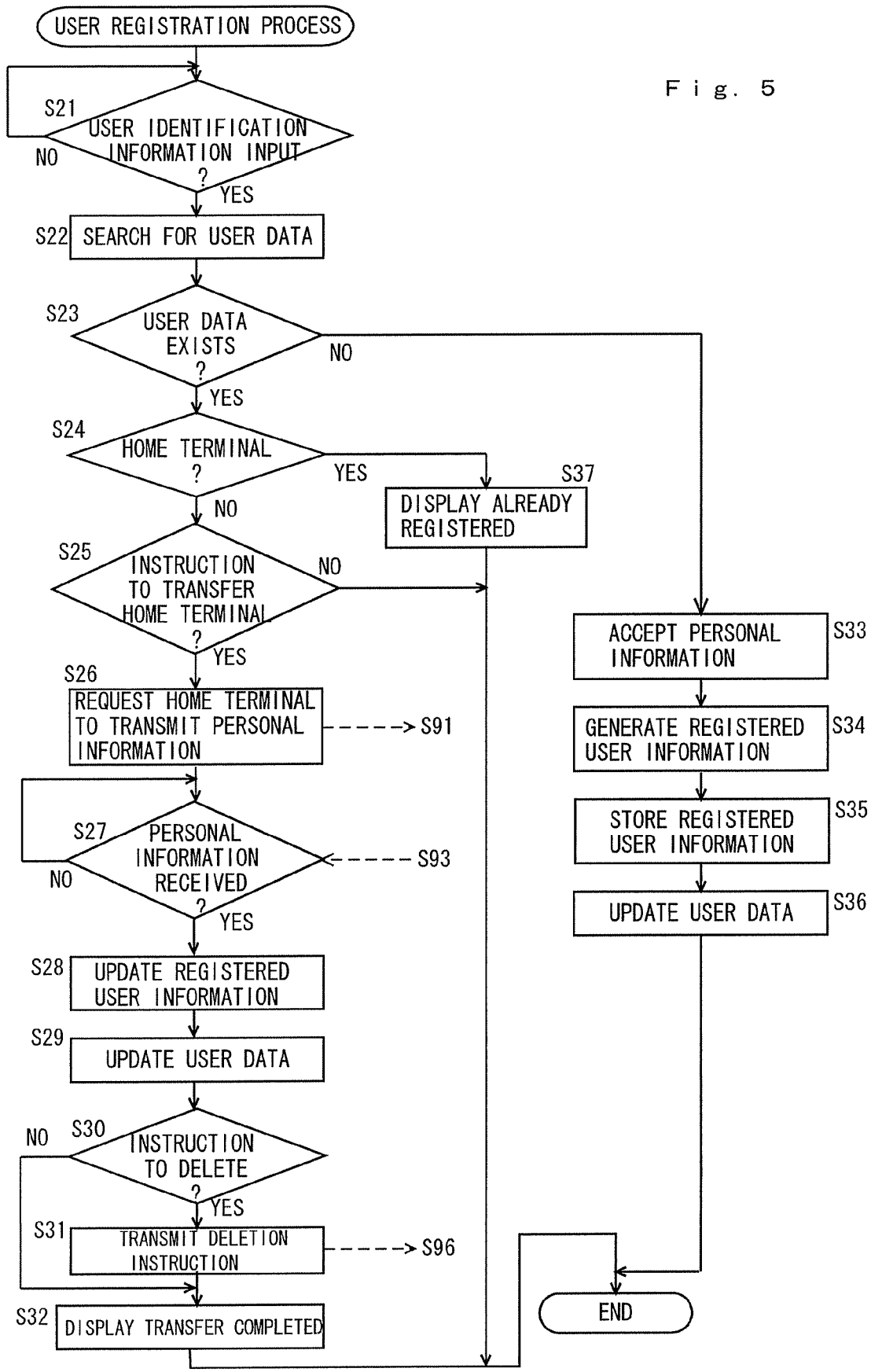
FIG. 5 is a flowchart illustrating an exemplary flow of a user registration process.

FIG. 5 is a flowchart illustrating an exemplary flow of a user registration process. The user registration process is a process performed at step S02 in FIG. 3A. Referring to FIG. 5, MFP 100 determines whether or not user identification information assigned to the user to be registered is input (step S21). The process stands by until the user identification information is input (NO at step S21), and if the user identification information is input, the process proceeds to step S22. Specifically, MFP 100 displays a user registration window on display portion 119B, and when the user operates input portion 119A in accordance with the window to input user identification information, the user identification information is accepted by MFP 100. The user registration window includes a region for inputting user identification information and personal information.

At step S22, the user data that have already been stored in MFP 100 is searched, and the user data including the user identification information input at step S21 is extracted. Then, it is determined whether or not the user data including the user identification information input at step S21 is extracted (step S23). If such user data is extracted, the process proceeds to step S24, and if not extracted, the process proceeds to step S33. In the case where user data is not stored in MFP 100, MFP 100 is newly connected to network 2 and therefore the process proceeds to step S33, similarly to the case where no user data is extracted.

At step S24, it is determined whether or not MFP 100 is the home terminal for the user of the user identification information input at step S21. Specifically, it is determined whether or not the item of the home terminal of the extracted user data includes the IP address (apparatus identification information) assigned to MFP 100. If MFP 100 is the home terminal, the process proceeds to step S37, and if not the home terminal, the process proceeds to step S25. At step S37, a message indicating that the user has already been registered appears on display portion 119B, and the process then ends. This is because in the case where the user registration process is executed by MFP 100, if MFP 100 is the home terminal for the user to be registered, the registered user information need not be newly stored since the registered user information has already been stored in HDD 107 of MFP 100.

If MFP 100 is not the home terminal for the user of the user identification information input at step S21, any of other MFPs 100A, 100B, 100C should be the home terminal. At step S25, it is determined whether or not an instruction to transfer the home terminal is input. If an instruction to transfer the home terminal is input, the process proceeds to step S26. If an instruction not to transfer the home terminal is input, the process ends. Specifically, a transfer confirmation window appears on display portion 119B, including a message to prompt the user to transfer the home terminal, and when an instruction to transfer is input to input portion 119A by the user, MFP 100 accepts the instruction to transfer.

Figure 6:
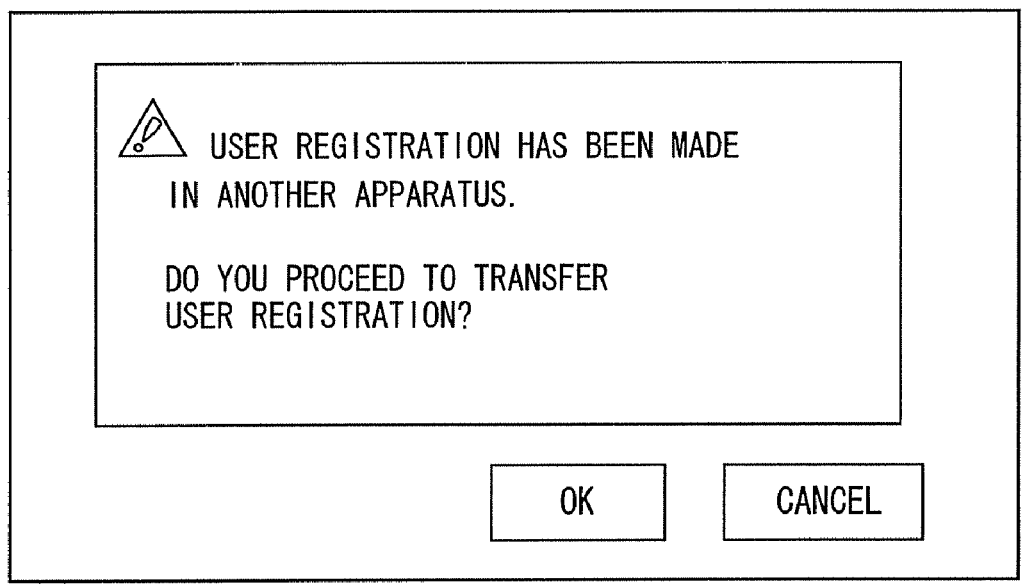
FIG. 6 shows an exemplary transfer confirmation window.

FIG. 6 shows an example of a transfer confirmation window. The transfer confirmation window includes a message "User registration has been made in another apparatus. Do you proceed to transfer user registration?", a confirmation button indicating OK, and a cancel button indicating CANCEL. When designation of the confirmation button by the user is detected by input portion 119A, MFP 100 accepts the instruction to transfer. On the other hand, designation of the cancel button by the user is detected by input portion 119A, MFP 100 accepts the instruction not to transfer.

Returning to FIG. 5, if the instruction to transfer the home terminal is input, the home terminal is requested to transmit personal information (step S26). The request to transmit personal information including the user identification information input at step S21 is transmitted to the IP address in the item of the home terminal of the user data extracted at step S22. The home terminal receiving the request to transmit personal information reads the corresponding registered user information and transmits the personal information included in the read registered user information. Then, the personal information is received (step S27). Then, the registered user information is updated (step S28). Specifically, registered user information is generated from the user identification information input at step S21 and the personal information received at step S27 and is then newly stored in HDD 107.

Then, MFP 100 updates the user data stored in HDD 107 (step S29). The home terminal having the user data including the user identification information input at step S21 changes the IP address of the home terminal before registration to the IP address of MFP 100. Then, it is determined whether or not a deletion instruction is input (step S30). The deletion instruction is an instruction to delete the registered user information stored in the home terminal which has been the home terminal before the user is registered in MFP 100. If the deletion instruction is input, the process proceeds to step S31, and if the deletion instruction is not input, step S31 is skipped and the process proceeds to step S32. Specifically, a deletion confirmation window appears on display portion 119B including a message which prompts the user to delete the registered user information from the home terminal before registration. When the deletion instruction is input to input portion 119A, MFP 100 accepts the deletion instruction.

Figure 7:
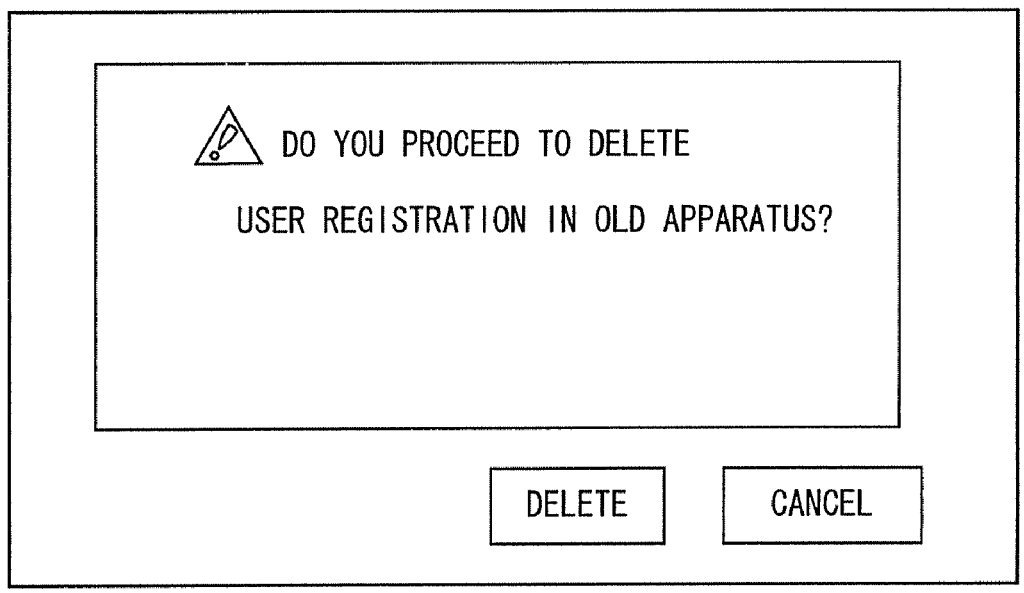
FIG. 7 shows an exemplary deletion confirmation window.

FIG. 7 shows an example of a deletion confirmation window. The deletion confirmation window includes a message "Do you proceed to delete the user registration in the old apparatus?," a deletion instruction button indicating DELETE, and a cancel button indicating CANCEL. When designation of the deletion instruction button by the user is detected by input portion 119A, MPF 100 accepts the deletion instruction. On the other hand, when designation of the cancel button by the user is detected by input portion 119A, MFP 100 accepts the instruction not to delete.

Returning to FIG. 5, at step S31, a deletion instruction signal to delete the registered user information including the user identification information input at step S21 is transmitted to the home terminal for the user which has been the home terminal before that user is registered. The deletion instruction signal includes the user identification information input at step S21. This is to specify the registered user information to be deleted, at the home terminal for the user which has been the home terminal before that user is registered. Accordingly, the home terminal that has received the deletion instruction signal deletes the corresponding registered user information from HDD 107. Therefore, the user inputs the deletion instruction so that the registered user information can be stored in any one of a plurality of MFPs 100, 100A, 100B, 100C. Thus, one home terminal can be set for one user. In the foregoing description, transfer and deletion are performed according to individual instructions. Alternatively, deletion may be performed automatically after transfer.

At the next step S32, a transfer completed window appears on display portion 119B including a message indicating that the process of transferring the home terminal for the user to whom the user identification information input at step S21 is assigned has been completed.

Here, if the deletion instruction is not input at step S30, step S31 is not executed. Thus, the registered user information including the user identification information input at step S21 is stored in the home terminal before registration and MFP 100 after registration. Therefore, two or more of MFPs 100, 100A, 100B, 100C can be set as home terminals.

On the other hand, at step S33, an input of personal information is accepted. Then, new registered user information is generated from the accepted personal information and the user identification information input at step S21 (step S34), and the generated registered user information is stored in HDD 107 (step S35). In addition, the user data stored in HDD 107 is updated (step S36) and the process then ends. The user data is updated by newly generating user data having the user identification information input at step S21 and the IP address of MFP 100 associated with each other and then storing the generated user data in HDD 107.

The user performs a log-in operation to operate any of MFPs 100, 100A, 100B, 100C. Specifically, the log-in operation is an operation of inputting user identification information. In the following, among MFPs 100, 100A, 100B, 100C, MFP on which a user performs a log-in operation is referred to as an operation terminal. Here, for the sake of brevity, the user of user identification information "Julie" performs a log-in operation on MFP 100, by way of example. In this case, MFP 100 is the operation terminal and MFP 100A is the home terminal. An operation input process is performed at the operation terminal and a personal information management process is performed at the home terminal.

Figure 8:
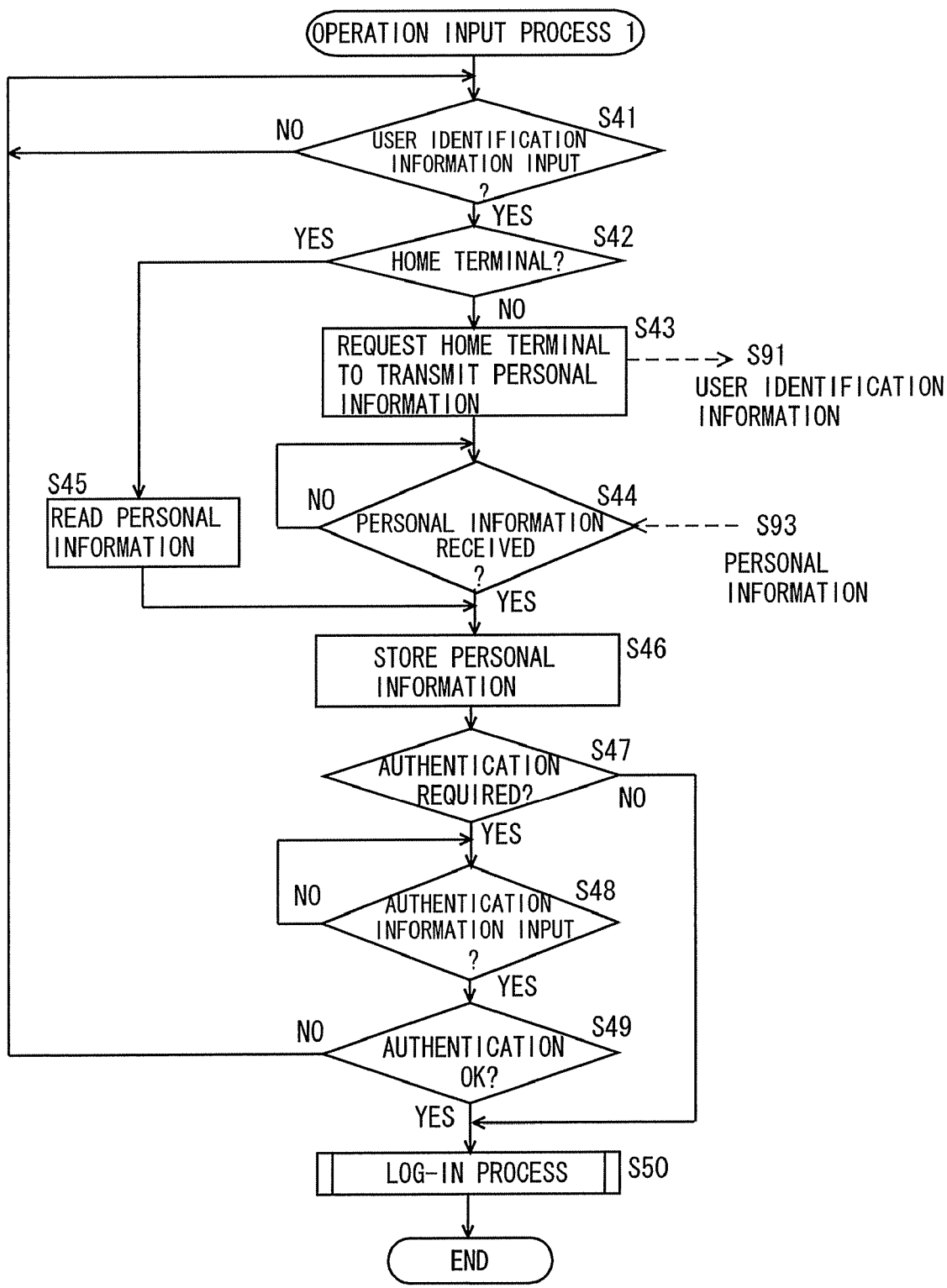
FIG. 8 is a flowchart illustrating an exemplary flow of an operation input process.

FIG. 8 is a flowchart illustrating an exemplary flow of an operation input process. The operation input process is implemented by the program stored in flash ROM 108 being loaded to RAM 105 of each of MFPs 100, 100A, 100B, 100C and being executed by each CPU 101. This program is part of the image processing program.

Referring to FIG. 8, MFP 100 as the operation terminal accepts an input of user identification information of the user "Julie" (step S41). The process stands by until user identification information is input (NO at step S41). If user identification information is input, the process proceeds to step S42. In other words, the operation terminal executes the process after step S42 on condition that user identification information is input. In the following, the user to whom the user identification information input at step S41 is assigned is referred to as a log-in user. At step S42, it is determined whether or not the operation terminal is the home terminal for the log-in user based on the input user identification information (step S42). More specifically, the user data stored in HDD 107 is searched using the user identification information, and it is determined whether or not the apparatus identification information stored in relation with the user identification information is the apparatus identification information assigned to the MFP 100 itself. If the operation terminal is the home terminal for the user, the process proceeds to step S45, and if not, the process proceeds to step S43. Here, since MFP 100 is not the home terminal for the user having the user identification information "Julie," the process proceeds to step S43.

At step S43, MFP 100A as the home terminal for the user of the user identification information "Julie" is requested to transmit personal information. This transmission request at least includes user identification information. Therefore, the apparatus identification information of the home terminal, here, the IP address of MFP 100A is used to transmit the transmission request including the user identification information. Then, the process stands by until the personal information is received in response to the transmission request transmitted at step S43 (NO at step S44). Upon reception of the personal information, the process proceeds to step S46.

On the other hand, at step S45, the registered user information stored in HDD 107 of MFP 100 is searched for, so that the personal information stored in relation with the user identification information input at step S41 is read. Thereafter, the process proceeds to step S46. At step S46, the personal information read at step S45 or the personal information received at step S44 is stored in RAM 105 so that it is set as the personal information of the log-in user.

Then, it is determined whether or not user authentication is required (step S47). Whether or not user authentication is required may be set in each of MFPs 100, 100A, 100B, 100C, in advance. User authentication is usually set as being required. If user authentication is required, the process proceeds to step S48, and if not required, the process proceeds to step S50. In the case where log-in authentication is not required, the log-in process described later is performed similarly to the case where a user logs in as a guest user.

Then, the user is prompted to input authentication information by means of screen display or voice output, and the process stands by until the authentication information is input (NO at step S48). If the authentication information is input, the process proceeds to step S49. At step S49, the authentication information input at step S48 is compared with the authentication information of the personal information stored in RAM 105. If both agree, it is determined that the authentication is established (authentication OK), execution of the following process is enabled and the process proceeds to step S50. If both do not agree, it is determined that the authentication is failed, and the process returns to step S41. At step S50, the log-in process is performed and the process then ends.

Figure 9:
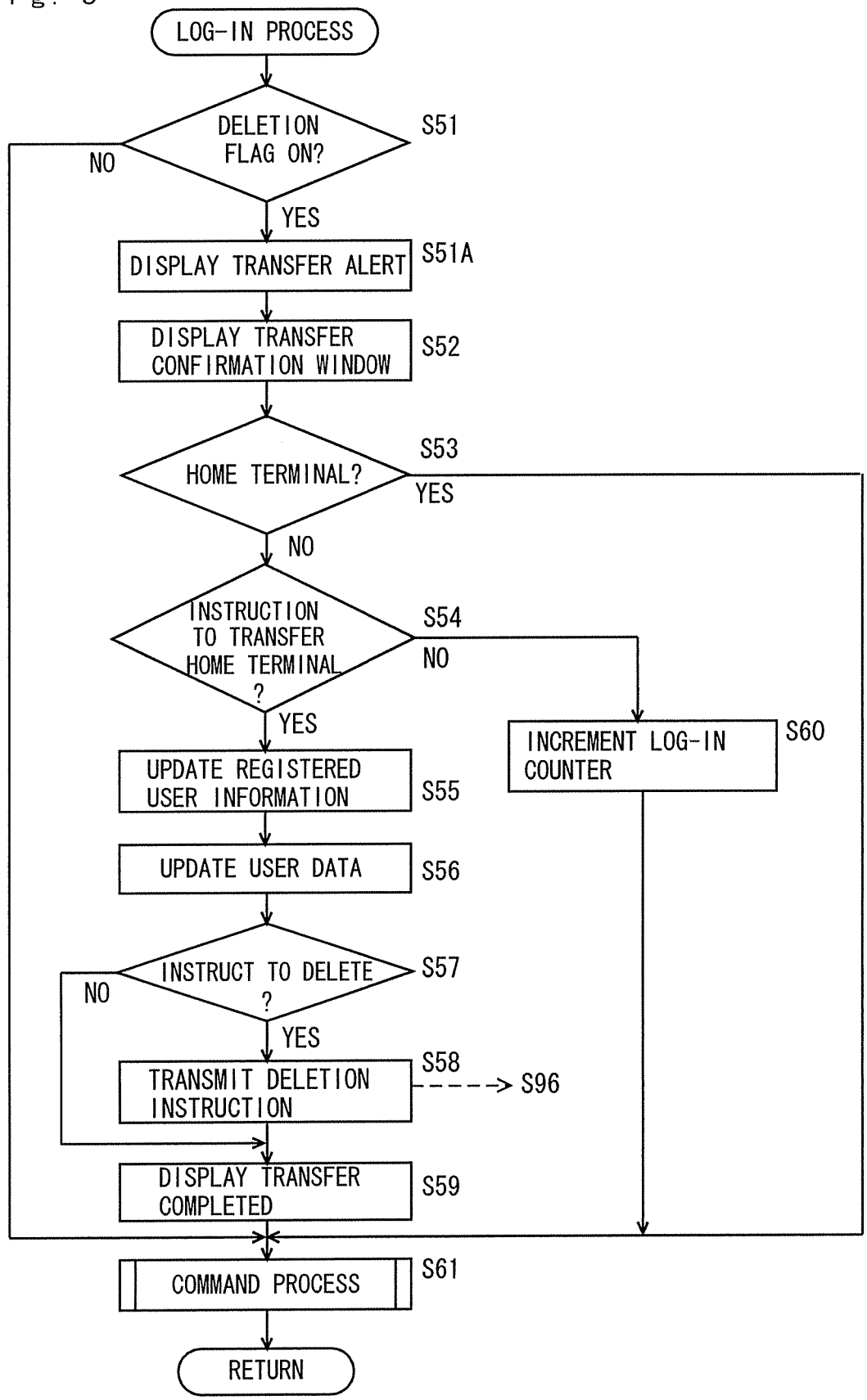
FIG. 9 is a flowchart illustrating an exemplary flow of a log-in process.

FIG. 9 is a flowchart illustrating an exemplary flow of a log-in process. The log-in process is a process performed at step S50 in FIG. 8. Referring to FIG. 9, it is determined whether or not the deletion flag of the personal information of the log-in user is ON (step S51). The personal information of the log-in user is the personal information stored in RAM 105 at step S46 in FIG. 8. In other words, the personal information is either the personal information received from the home terminal at step S44 in FIG. 8 or the personal information read from HDD 107 of MFP 100 at step S45 in FIG. 8. If the deletion flag is ON, the process proceeds to step S51A, and if the deletion flag is OFF, the process proceeds to step S61.

Figure 10:
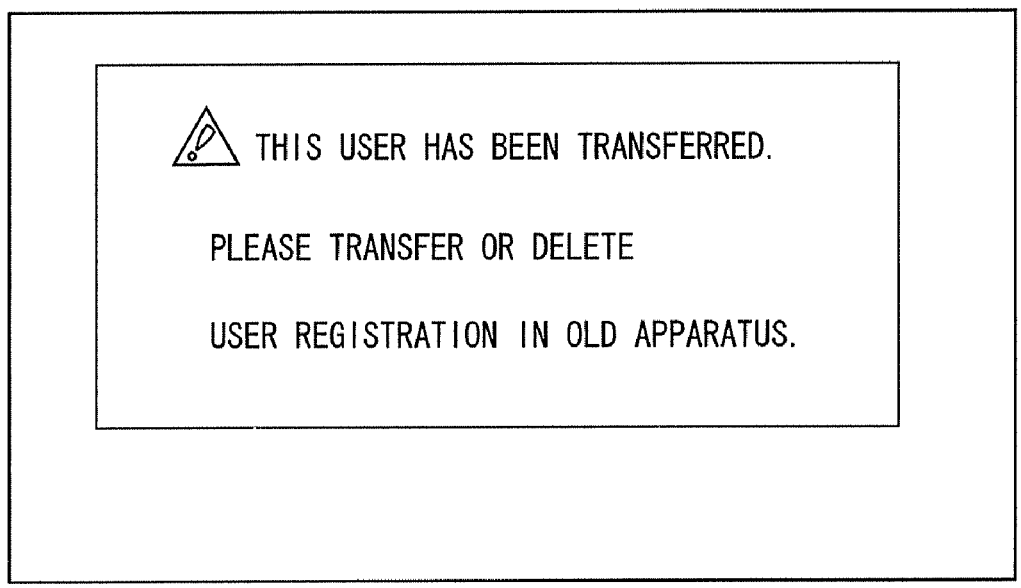
FIG. 10 shows an exemplary transfer alert window.

At step S51A, a transfer alert window shown in FIG. 10 is displayed to alert the user that the user registration is left in the old home terminal. Then, the transfer confirmation widow shown in FIG. 6 appears on display portion 119B (step S52). These windows let the user know that the home terminal has to be changed. The transfer confirmation window is an alert to prompt the user to transfer the home terminal. Then, it is determined whether or not MFP 100 is the home terminal for the log-in user. Specifically, the user data stored in HDD 107 is searched using the user identification information of the log-in user, so that it is determined whether or not the apparatus identification information stored in relation with the user identification information is the apparatus identification information assigned to MFP 100. If MFP 100 is the home terminal, the process proceeds to step S61, and if not home terminal, the process proceeds to step S54. In the case where the process proceeds to step S61, the transfer confirmation window is cleared after being displayed for a prescribed period of time.

At step S54, it is determined whether or not an instruction to transfer the home terminal is input. If an instruction to transfer the home terminal is input, the process proceeds to step S55, and if not, the log-in user is set as a guest user and the process proceeds to step S60. At step S60, a log-in counter of the log-in user is incremented. The log-in counter is provided for each user identification information included in the user data in each of MFPs 100, 100A, 100B, 100C. The log-in counter counts the number of times a user logs in, for each user identification information. The log-in counter is reset when the deletion flag is set ON. Therefore, at step S27 in FIG. 5, at the time when the personal information having the deletion flag set ON is initially received, MFP 100 resets the log-in counter corresponding to that personal information. In other words, the log-in counter counts the number of times the user logs in to each of MFPs 100, 100A, 100B, 100C after the deletion flag is set ON at the home terminal.

At step S55, the registered user information is updated. Specifically, registered user information is generated from the user identification information input at step S41 in FIG. 8 and the personal information received at step S44 and then newly stored in HDD 107. Then, MFP 100 updates the user data stored in HDD 107 (step S56). Since in the user data including the user identification information of the log-in user, the home terminal has the IP address of the home terminal before registration, the IP address of the home terminal before registration is changed to the IP address of MFP 100.

It is then determined whether or not a deletion instruction is input (step S57). If a deletion instruction is input, the process proceeds to step S58, and if a deletion instruction is not input, the step S58 is skipped and the process proceeds to step S59. Specifically, the deletion confirmation window shown in FIG. 7 appears on display portion 119B, and upon an input of the deletion instruction to input portion 119A, MFP 100 accepts the deletion instruction. At step S58, a deletion instruction signal for deleting the registered user information including the user identification information of the log-in user is sent to the home terminal for the user which has been the home terminal before the log-in user is registered. The deletion instruction signal includes the user identification information of the log-in user. This is to specify the registered user information to be deleted, at the home terminal for the user which has been the home terminal before the log-in user is registered. Accordingly, the home terminal that has received the deletion instruction signal deletes the corresponding registered user information from HDD 107. Therefore, the user inputs the deletion instruction so that the registered user information can be stored in any one of a plurality of MFPs 100, 100A, 100B, 100C. Thus, only one home terminal can be set.

At the next step S59, a transfer completed window appears on display portion 119A including a message indicating that a process of transferring the home terminal for the user to whom the user identification information of the log-in user is assigned has been completed. MFP 100 performs a command process at step S61.

It is noted that in the case where a deletion instruction is not input at step S57, step S58 is not performed, and therefore the registered user information of the log-in user is stored in the home terminal before registration and the operation terminal to which the user has logged in. Thus, two or more of MFPs 100, 100A, 100B, 100C can be set as home terminals.

Here, the process after step S55 may be performed if the counter value of the log-in counter exceeds a prescribed threshold value after the log-in counter is incremented at step S60. By doing this, the registered user information is forcedly transferred even if the user does not wish to transfer the home terminal, thereby preventing the registered user information from staying not transferred.

Figure 11:
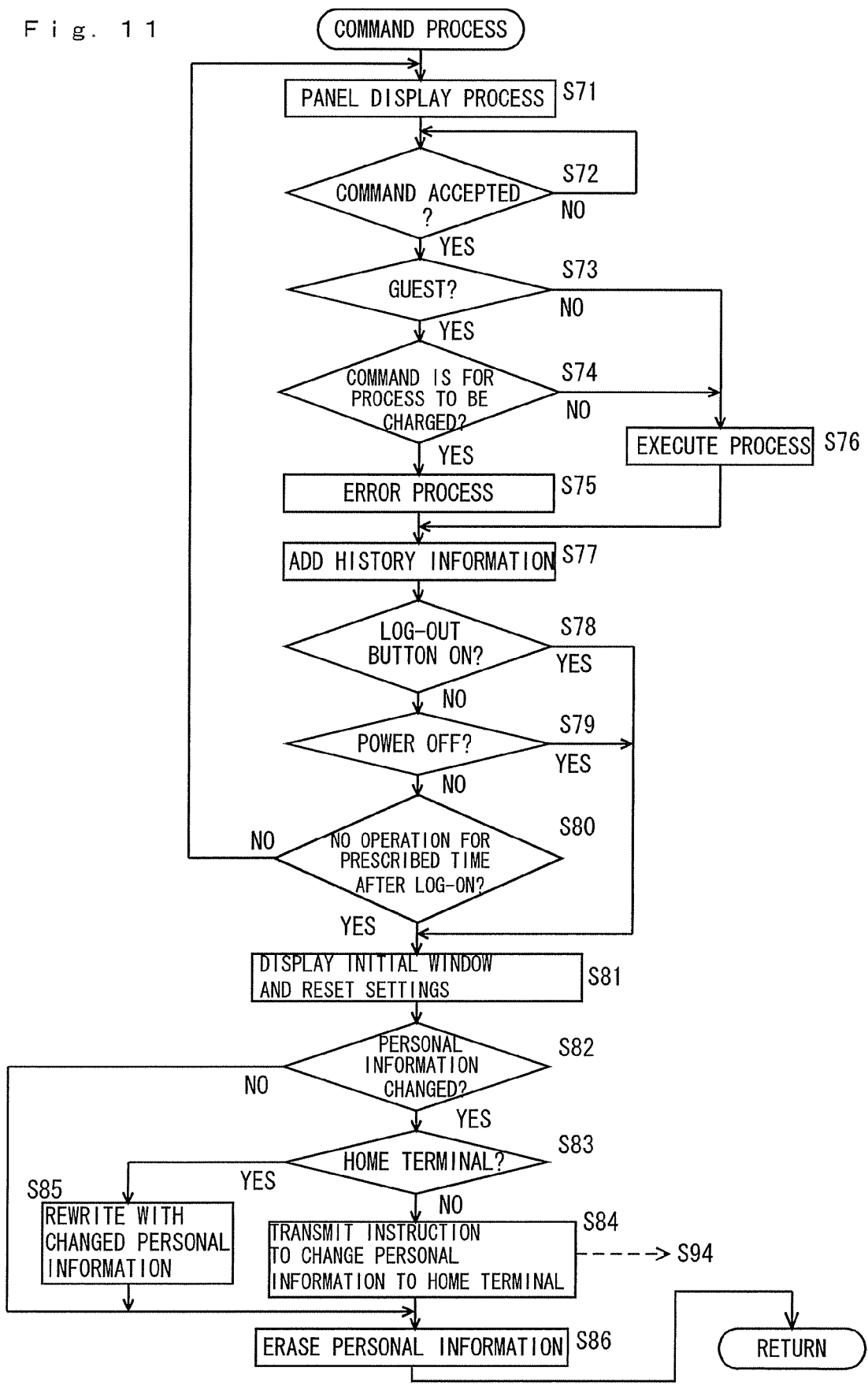
FIG. 11 is a flowchart illustrating an exemplary flow of a command process.

FIG. 11 is a flowchart illustrating an exemplary flow of a command process. Referring to FIG. 11, MFP 100 executes a panel display process based on personal information of the log-in user (step S71). The personal information of the log-in user is the personal information stored in RAM 105 at step S46 in FIG. 8. In other words, the personal information is either the personal information received by the home terminal at step S44 in FIG. 8 or the personal information read from HDD 107 of MFP 100 at step S45 in FIG. 8.

Upon execution of the panel display process, a window appears on display portion 119B which is customized according to the panel setting information of the personal information. In the panel display process, the window is displayed according to the panel setting information, which is switched to the panel setting information of the personal information. For example, in a copy window, the copy window is displayed according to copy information of the panel setting information that is initially set, which is then switched to copy information included in the panel setting information of the personal information. The copy window is then displayed according to the switched copy information. The copy information includes, for example, a magnification "same size," number of copies "two," sort "effective, " and the like. Here, MFP 100 as the operation terminal may not have the function that MFP 100A as the home terminal has. For example, although MFP 100A is equipped with a sorter, MFP 100 may not be equipped with the same. Even when sort "effective" is displayed in the copy window, MFP 100 does not have a sorting function, and therefore the copy window is not consistent with the function executable in MFP 100. Thus, in the copy window, the function that cannot be performed by the operation terminal, among the information included in the panel setting information, is displayed in a manner different from the manner in which the functions that can be performed by the operation terminal are displayed, in order to indicate that the acceptance of the instruction thereof is impossible. The indication that the acceptance of the instruction is impossible is displayed, for example, with lower density as compared with the other display.

In addition to the display of the copy window, the panel display process includes display of an address book, which is displayed when a transmission destination (the name, facsimile, email, network printer, file server, or groupware server of the user registered in other MFP) is designated. In the case where destination designation is designated in the panel display process, the address book of the personal information of the log-in user is read and displayed on display portion 119B.

The panel display process also allows the settings of the display of the copy window to be changed. In this case, the panel setting information of the personal information is changed. In addition, the panel display process allows the address book to be changed. For example, the change includes addition of a new destination, and change or deletion of an existing destination. A change in address book changes the address book of the personal information.

MFP 100 stands by until a command for causing MFP 100 to perform a process is accepted according to the window appearing on display portion 119B in the panel display process (NO at step S72). When the command is accepted (YES at step S71), it is determined whether or not the log-in user is a guest user (step S73). If the log-in user is set as a guest user, the process proceeds to step S74. If the log-in user is not set as a guest user, the process proceeds to step S76.

At step S74, it is determined whether or not the process corresponding to the command accepted at step S72 is a process to be charged. In MFP 100, whether a process is to be charged or not is preset, for each of the processes corresponding to respective commands. If the process corresponding to the command is to be charged, the process proceeds to step S75. If it is not to be charged, the process proceeds to step S76. At step S75, the process corresponding to the command is not performed and an error process is performed, for example, to display an error message. The process then proceeds to step S77. At step S76, the process corresponding to the command is performed and the process then proceeds to step S77. This is to prohibit the guest user from performing a process to be charged. Although here, a process that is not allowed to be executed by a guest user is a process to be charged, the present invention is not limited thereto. A process that is not allowed to be executed by a guest user may be arbitrarily defined in MFP 100. Specifically, such a process includes, for example, FAX transmission or scanning for storage into HDD of PC, viewing a personally received image, or an output allowed with a limited number of copies.

At step S77, history information is generated based on the result of execution of the process performed by MFP 100. The history information includes the result of execution of an error process. Then, the history information is added to the history information of the personal information stored in RAM 105 (step S77).

At the next steps S78-S80, it is determined whether or not a log-out instruction is given. If the log-out instruction is given, the process proceeds to step S81. If the instruction is not given, the process returns to step S71. In other words, step S71-step S77 are repeatedly performed until the log-out instruction is given. The log-out instruction is given (1) when a log-out button on input portion 119A is pressed, (2) when an instruction to power off MFP 100 as the operation terminal is input, or (3) when an input of an operation to input portion 119A is not made for a prescribed period of time after log-on. Specifically, if the log-out button is pressed at step S78, the process proceeds to step S81, and if not, the process proceeds to step S79. If an instruction to power off is input at step S79, the process proceeds to step S81, and if not, the process proceeds to step S80. If an input of an operation is not made for a prescribed period of time after log-on at step S80, the process proceeds to step S81, and if not, the process returns to step S71.

Here, If an instruction to power off is input, MFP 100 as the operation terminal is not immediately powered off but is powered off after the next steps S81-S86 end.

At step S81, the window to be displayed on display portion 119B is switched to an initial window, and parameters (including the panel setting information) set in MFP 100 are all set to initial values. Then, at step S82, it is determined whether or not the personal information stored in RAM 105 is changed by the panel display process at step S71. If the personal information has been changed, the process proceeds to step S83, and if not changed, the process proceeds to step S86.

At step S83, it is determined whether or not MFP 100 is the home terminal for the log-in user. If the home terminal, the process proceeds to step S85, and if not the home terminal, the process proceeds to step S84. At step S84, an instruction to change the personal information is transmitted to the home terminal. This change instruction includes the user identification information "Julie" of the log-in user and the changed personal information. On the other hand, at step S85, the personal information of the registered user information stored in HDD 107 is rewritten with the changed personal information stored in RAM 105. Then, at step S86, the personal information stored in RAM 105 is erased. Accordingly, the personal information of the user who logged in before is not used for the user who subsequently logs in.

Here, the personal information is erased from RAM 105 at step S86. However, the personal information may be temporarily stored in HDD 107 and the temporarily stored personal information may be read when the same user logs in again. The personal information temporarily stored in HDD 107 may be erased after a prescribed period of time. Thus, the personal information does not stay stored in an operation terminal other than the home terminal.

Figure 12:
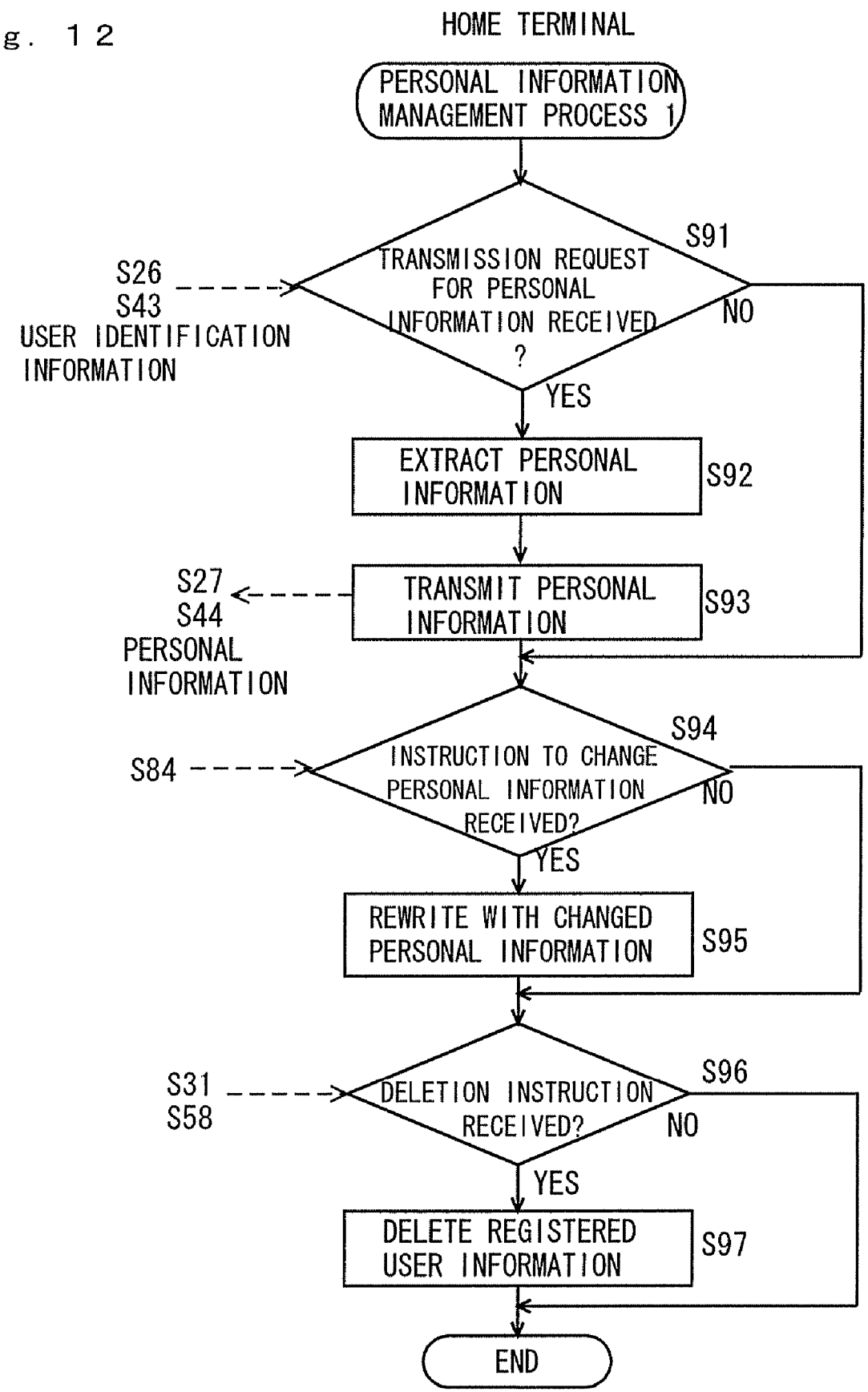
FIG. 12 is a flowchart illustrating an exemplary flow of a personal information management process.

FIG. 12 is a flowchart illustrating an exemplary flow of a personal information management process. The personal information management process is implemented by the program stored in flash ROM 108 being loaded in RAM 105 of each of MFPs 100, 100A, 100B, 100C and being executed by each CPU 101. This program is part of the image processing program. The personal information management process is a process performed in a home terminal. Here, the log-in user to MFP 100 as the operation terminal is "Julie," and therefore MFP 100A as the home terminal for the user "Julie" performs the personal information management process, by way of example.

MFP 100A determines whether or not a request for transmission of the personal information is received from MFP 100 as the operation terminal (step S91). If the transmission request is received, the process proceeds to step S92, and if not received, the process proceeds to step S96. At step S92, the registered user information stored in HDD 107 is searched for using the user identification information included in the received transmission request, and the personal information stored in relation with that user identification information is extracted. Then, the extracted personal information is transmitted to MFP 100 which is the operation terminal that transmitted the transmission request (step S93).

At step S94, MFP 100A determines whether or not an instruction to change the personal information is received from MFP 100 as the operation terminal. If the change instruction is received, the process proceeds to step S95, and if not received, the process proceeds to step S96. At step S95, the registered user information stored in HDD 107 is rewritten using the user identification information and the personal information included in the received change instruction. Specifically, the personal information of the registered user information that includes the user identification information included in the change instruction, among the registered user information stored in HDD 107, is rewritten with the personal information included in the change instruction. Accordingly, the personal information changed by the user at MFP 100 as the operation terminal can be incorporated into the registered user information stored by MFP 100A as the home terminal. Therefore, even when the user logs in to any of MFPs 100, 100A, 100B, 100C next time, the panel display process is performed based on the changed personal information.

At step S96, MFP 100A determines whether or not the deletion instruction is received. If the deletion instruction is received, the process proceeds to step S97, and if not received, the process ends. When the deletion instruction is transmitted at step S31 by MFP 100 which performs the user registration process shown in FIG. 5 or when the deletion instruction is transmitted at step S58 by MFP 100 as the operation terminal which performs the log-in process shown in FIG. 9, the deletion instruction is received by MFP 100A as the home terminal. At step S97, the registered user information including the user identification information included in the received deletion instruction is deleted from HDD 107.

<Forced Transfer>

In order to cancel registration of the user who is registered in a home terminal, the administrator of that home terminal sets the deletion flag ON in the registered user information of that user. Thereafter, if the user registration process shown in FIG. 5 is performed in MFP different from the home terminal, the registered user information is transferred to MFP that performs the user registration process. However, if the user registration process is not performed, or even if executed, if an instruction to transfer the home terminal is not input (NO at step S25), for example, the registered user information of that user is kept stored in the home terminal. Even if that user logs in to another terminal other than the home terminal, if an instruction to transfer the home terminal is not input (NO at step S54 in FIG. 9), the registered user information of that user is kept stored in the home terminal, similarly. In such a case, a forced transfer process is performed in the home terminal, where MFP is determined that should be the next home terminal for the user whose registration is cancelled, and the registered user information is forcedly transferred to the determined MFP.

Figure 13:
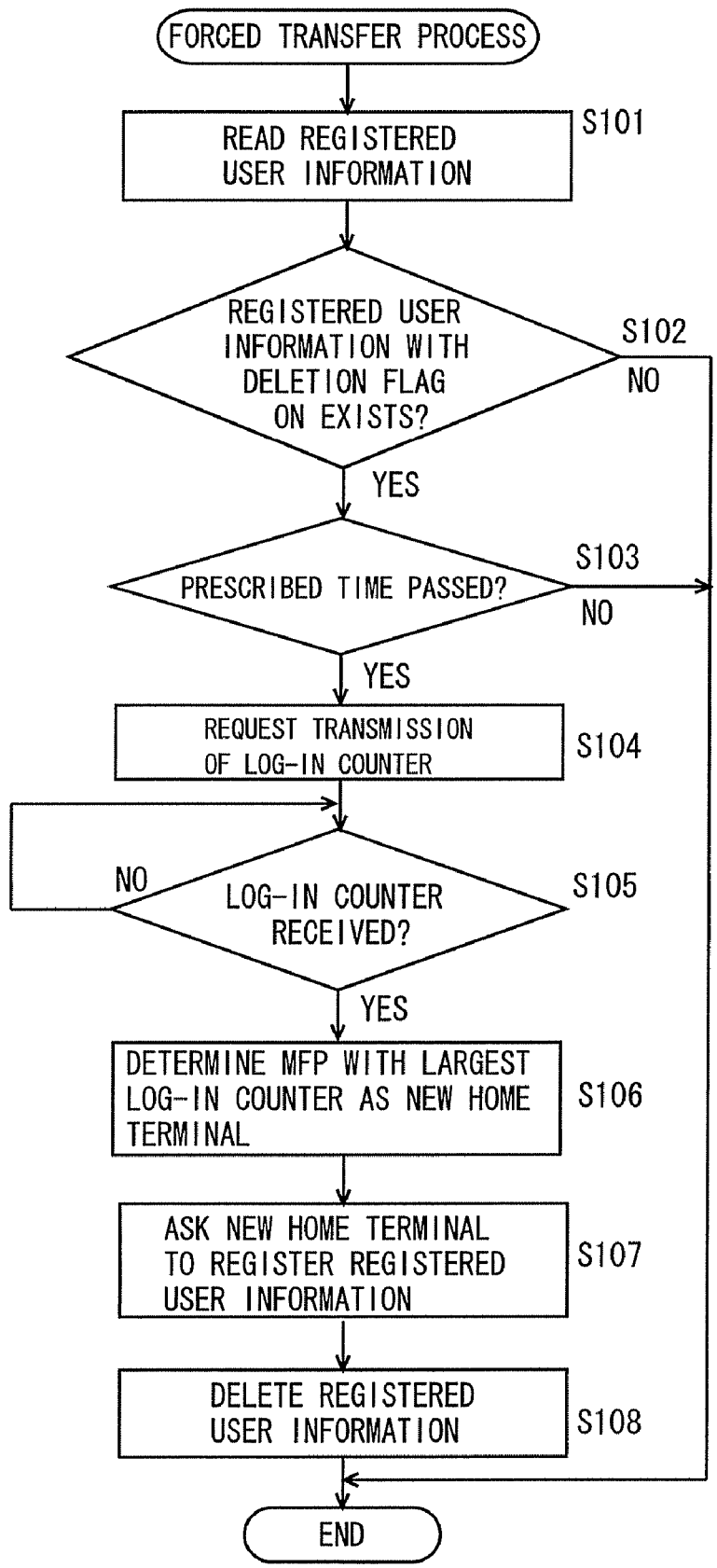
FIG. 13 is a flowchart illustrating an exemplary flow of a forced transfer process.

FIG. 13 is a flowchart illustrating an exemplary flow of the forced transfer process. Here, the home terminal is MFP 100C by way of illustration. Referring to FIG. 13, MFP 100C reads the registered user information stored in HDD 107 (step S101). Then, it is determined whether or not the registered user information having the deletion flag set ON exists among the read registered user information (step S102). If such registered user information exists, the process proceeds to step S103, and if not exist, the process ends.

Here, referring to FIG. 4D, among the registered user information stored by MFP 100C, the registered user information with number "4" and the user identification information "Michael" has the deletion flag set ON. At step S103, it is determined whether or not a prescribed period of time has passed since the deletion flag in the registered user information with number "4" and the user identification information "Michael" was set ON. If a prescribed period of time has passed, the process proceeds to step S104, and if not, the process ends. This is to give the user a prescribed grace period to transfer the registered user information after the deletion flag was set ON.

At step S104, a request for transmission of the counter value of the log-in counter for the user identification information "Michael" is transmitted to all the other MFPs 100, 100A, 100B. The transmission request at least includes the user identification information "Michael". The transmission request may be transmitted by broadcast or may be transmitted individually. Then, the process stands by until the counter value of the log-in counter is received from all the other MFPs 100, 100A, 100B (NO at step S105). If the counter value of the log-in counter is received from all the other MFPs 100, 100A, 100B, the process proceeds to step S106.

At step S106, among all the other MFPs 100, 100A, 100B, MFP that has transmitted the largest counter value is determined as a new home terminal. Here, it is assumed that MFP 100B has transmitted the largest counter value of the log-in counter. Then, MFP 100B determined as a new home terminal is requested to register the registered user information of the user identification information "Michael" (step S107). Specifically, the registered user information of the user identification information "Michael" and a registration request instruction are transmitted to MFP 100B. Upon reception of the registration request instruction, MFP 100B stores into its HDD 107 the registered user information of the user identification information "Michael", which is received together with the registration request instruction. Thus, MFP 100B is set as the home terminal for the user "Michael".

Then, the registered user information of the user identification information "Michael" is deleted from HDD 107 of MFP 100C (step S108). Thus, MFP 100C is no longer the home terminal for the user "Michael".

As described above, in image processing system in the first embodiment, user identification information is input (YES at step S21), and if user data including the input user identification information is stored (YES at step S23), MFP 100 as the operation terminal requests MFP 100A as the home terminal specified by the apparatus identification information associated with the accepted user identification information by the user data, to transmit the registered user information including the input user identification information (step S26) and stores the registered user information received in response to the transmission request (step S28). Therefore, with the user's simple operation of inputting the user identification information at MFP 100 as the operation terminal, the registered user information can be received and stored in MFP 100 as the operation terminal from MFP 100A as the home terminal storing that registered user information.

In addition, if the user data including the input user identification information is stored (YES at step S23), MFP 100A which is the home terminal specified by the apparatus identification information included in that user data is instructed to delete the registered user information including the input user identification information (step S31). Therefore, the registered user information of the user registered in home terminal MFP 100A before change is deleted from the home terminal MFP 100A before change so that the user information can be stored in one MFP 100, which is the home terminal after change.

Furthermore, on condition that an allowance for deletion is accepted (YES at step S30), an instruction to delete the registered user information is given (step S31). Thus, an instruction to delete is not given if an allowance for deletion is not accepted. Therefore, the registered user information may be stored in home terminals MFPs 100 and 100A before and after change.

Moreover, in response to an input of user identification information (YES at step S41), user data including that user identification information is extracted (step S42). If the extracted user data includes deletion information indicating that the registered user information is to be deleted (YES at step S51), an alert is output (step S52). Since an alert is output when user identification information for which registered user information is to be deleted is accepted, the user can be aware that the home terminal that stores the registered user information for the user has to be changed.

Furthermore, on condition that user identification information is input (YES at step S49), a process is performed based on the operation by the user of that user identification information (step S76). If an alert is output (YES at step S51), execution of the process based on the operation by the user of the accepted user identification information is prohibited (YES at step S74). This prevents execution of the process without changing the home terminal. For example, execution of only a prescribed process such as a process to be charged can be prohibited exclusively for the log-in user who does not transfer the home terminal.

In addition, the number of times the transfer confirmation window is displayed are counted for each user identification information (step S60), and based on the number of times the transfer confirmation is displayed, among MFPs 100, 100A, 100B, 100C, the next home terminal is determined into which registered user information including the user identification information associated with the deletion flag is to be stored. Therefore, a new home terminal can be determined in accordance with the actual condition of user's usage.

Second Embodiment

The overall configuration of an image processing system 1A in the second embodiment is similar to that of image processing system 1 in the first embodiment shown in FIG. 1. The hardware configuration of each of MFPs 100, 100A, 100B, 100C which constitute image processing system 1A is the same as that of MFP 100 shown in FIG. 2. Therefore, a description thereof will not be repeated here.

In the first embodiment, user data is stored in each of MFPs 100, 100A, 100B, 100C which constitute image processing system 1. In image processing system 1A in the second embodiment, user data is not stored in MFPs 100, 100A, 100B, 100C. Therefore, the initial setting process and the connection process shown in FIG. 3 are not performed. When MFP 100 is newly connected to network 2, a process necessary for connecting to network 2 (for example, setting of an IP address) and registered user information are stored. Therefore, each of MFPs 100, 100A, 100B, 100C in the second embodiment transmits a request to transmit personal information to network 2 by broadcast to obtain the personal information of a log-in user from the home terminal. In the following, differences from image processing system 1 in the first embodiment will be described.

In the flow of user registration in FIG. 5, the process of searching for the user data at step S22 is replaced by a process of transmitting a signal by broadcast to inquire whether or not personal information is registered in other image processing apparatuses, and when the personal information is transmitted from any other apparatus, the processes after step S23 follow.

Figure 14:
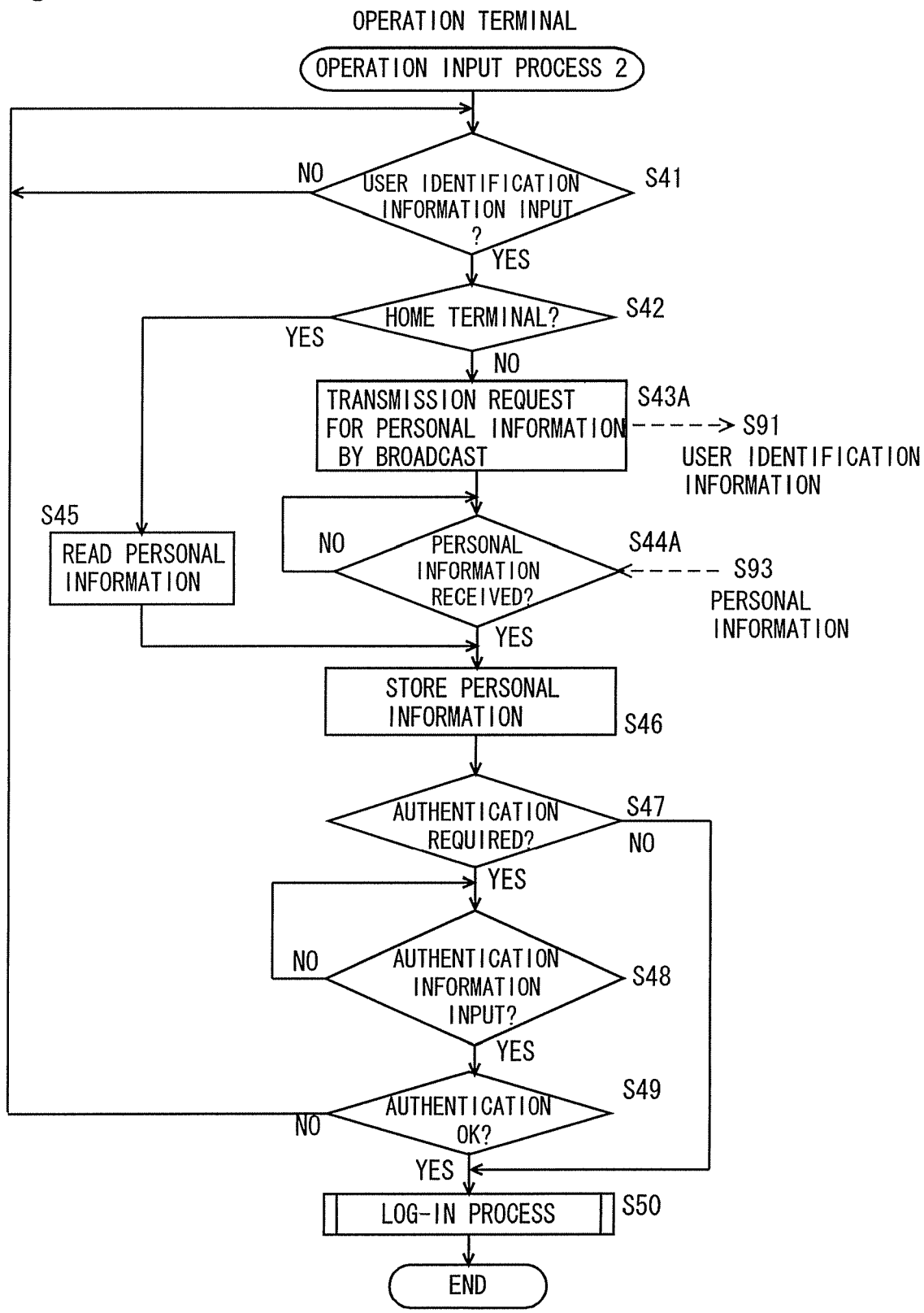
FIG. 14 is a flowchart illustrating an exemplary flow of an operation input process in a second embodiment.

FIG. 14 is a flowchart illustrating an exemplary flow of an operation input process in the second embodiment. This operation input process is a process performed at an operation terminal. Here, the operation terminal is MFP 100 by way of illustration. Referring to FIG. 14, unlike the operation process in the first embodiment shown in FIG. 8, step S43 is replaced by step S43A and step S44 is replaced by step S44A. The other processes are the same as those in the operation process shown in FIG. 8 and therefore the description will not be repeated here.

At step S43A, a transmission request is output to network 2 by broadcast to request transmission of personal information. This transmission request at least includes user identification information. Thus, user identification information is transmitted by broadcast. Accordingly, the transmission request is received at all the MFPs 100A, 100B, 100C other than MFP 100 as the operation terminal. Then, the process stands by until personal information is received in response to the transmission request for personal information which is transmitted at step S43A (NO at step S44A). Upon reception of personal information (YES at step S44A), the process proceeds to step S46.

Figure 15:
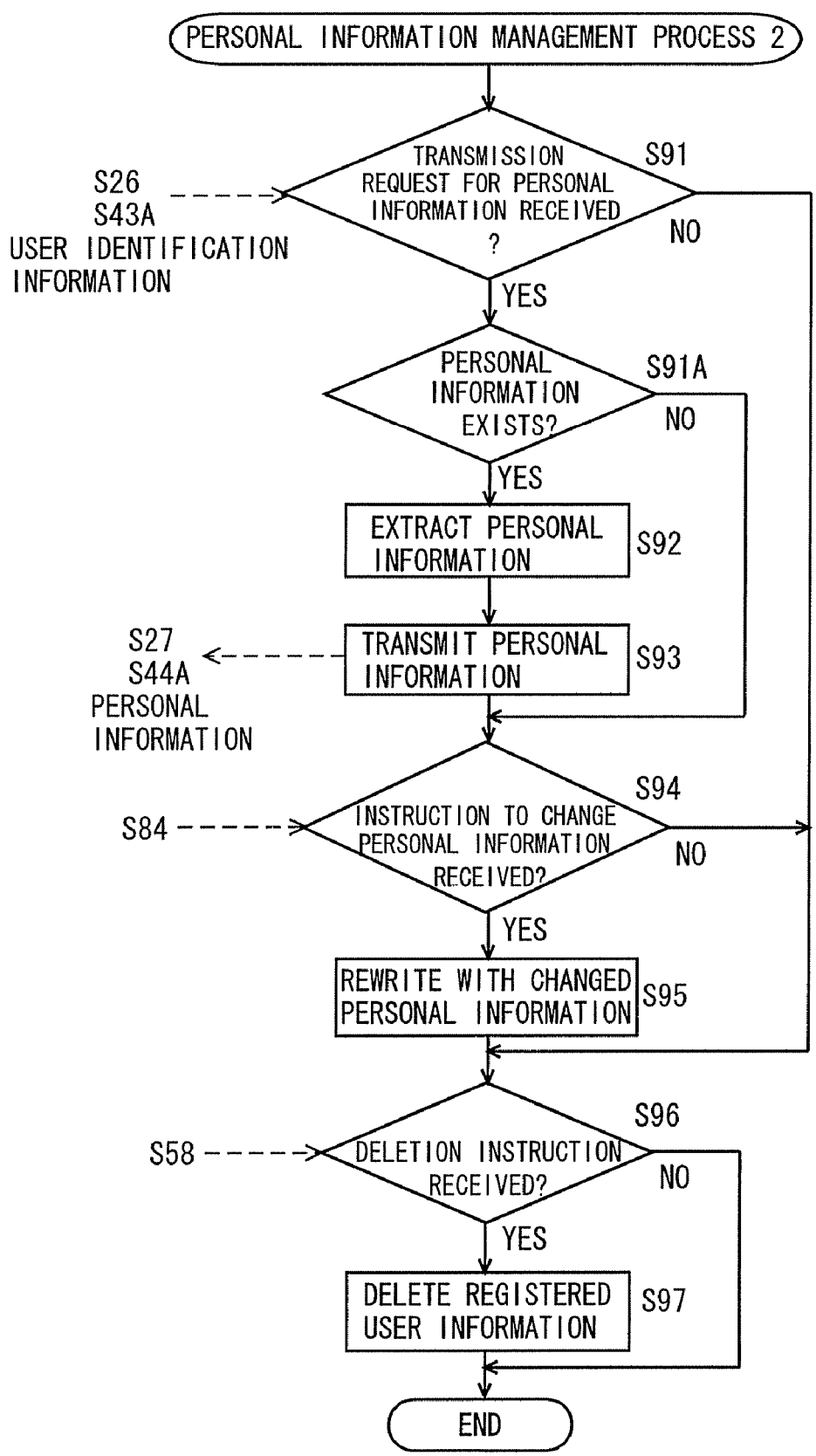
FIG. 15 is a flowchart illustrating an exemplary flow of a personal information management process in the second embodiment.

FIG. 15 is a flowchart illustrating an exemplary flow of a personal information management process in the second embodiment. The personal information management process in the second embodiment shown in FIG. 15 is a process performed at a terminal other than the operation terminal. Here, as the operation terminal is MFP 100, the process is performed in each of MFPs 100A, 100B, 100C. Referring to FIG. 15, unlike the personal information management process in the first embodiment shown in FIG. 12, a process of step S91A is added after the process at step S91. The other processes are the same as those in the personal information management process shown in FIG. 12 and therefore the description will not be repeated here.

At a terminal other than the operation terminal, it is determined whether or not the transmission request for personal information is received (step S91). If the transmission request is received, the process proceeds to step S91A, and if not, the process ends. At step S91A, the registered user information stored in HDD 107 is searched for using the user identification information included in the received transmission request, so that it is determined whether or not the registered user information including that user identification information exists. If exist, the process proceeds to step S92. If not exist, the process proceeds to step S94. If the terminal that performs the personal information management process is a home terminal, the process proceeds to step S92, and if it is a terminal other than the home terminal, the process proceeds to step S94. At step S92, personal information stored in relation with that user identification information is extracted. Then, the extracted personal information is transmitted to MFP 100 which is the operation terminal that transmitted the transmission request (step S93).

In image processing system 1A in the second embodiment, unlike image processing system 1 in the first embodiment, although each MFP 100, 100A, 100B, 100C does not store user data, the effect similar to that of image processing system 1 in the first embodiment can be achieved.

In the embodiments as described above, image processing systems 1, 1A have been described. However, the present invention can be understood as a registered user management method and a registered user management program executed by each of MFPs 100, 100A, 100B, 100C included in image processing systems 1, 1A, as a matter of course.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image processing system comprising a plurality of image processing apparatuses connected to a network,
   wherein each of said image processing apparatuses comprises:
   a registered user information storage portion to store registered user information including user identification information for identifying each user;
   a user identification information input portion to accept an input of user identification information;
   a registration portion to register the inputted user identification information by storing registered user information including the inputted user identification information in the registered user information storage portion;
   a user data storage portion to store user data which includes the registered user identification information and apparatus identification information for identifying the image processing apparatus storing the registered user information including the registered user identification information, in association with each other;
   a registered user information requesting portion to request transmission of the registered user information including the inputted user identification information from one of the image processing apparatus identified by apparatus identification information associated with the inputted user identification information of user data to another of the image processing apparatus, when user data including the inputted user identification information is stored in the user data storage portion of the another of the image processing apparatus; and
   an additional registration portion to additionally store the registered user information sent from the one image processing apparatus to the registered user information storage portion in the another of the image processing apparatus in response to reception of the registered user information.

2. The image processing system of claim 1, wherein each of the image processing apparatus further comprises
   a delete instruction portion to give an instruction of deletion of the registered user information including the registered user identification information, to the image processing apparatus identified by apparatus identification information associated with the inputted user identification information, when the inputted user identification information of the user data is stored in the user data storage portion.

3. The image processing system of claim 2, wherein each of the image processing apparatus further comprises
   a delete allowance portion to allow an instruction of deletion of the registered user information by the delete instruction portion.

4. The image processing system of claim 1, wherein each of the image processing apparatus further comprises
   an extracting portion to extract user data including the inputted user identification information from the user data storage portion in response to acceptance of the input of the user identification information at the user identification information input portion.

5. The image processing system of claim 4, wherein each of the image processing apparatus further comprises
   an alert portion to alert a user before deletion of extracted user data including the inputted user identification information.

6. An image processing apparatus connected to a network, comprising:
   a registered user information storage portion to store registered user information including user identification information for identifying each user;
   a user identification information input portion to accept an input of user identification information;
   a registration portion to register the inputted user identification information by storing registered user information including the inputted user identification information in the registered user information storage portion;
   a user data storage portion to store user data which includes the registered user identification information and apparatus identification information for identifying the image processing apparatus storing the registered user information including the registered user identification information, in association with each other;
   a registered user information requesting portion to request transmission of the registered user information including the inputted user identification information from another image processing apparatus identified by apparatus identification information associated with the inputted user identification information of user data to the image processing apparatus, when user data including the inputted user identification information is stored in the user data storage portion the image processing apparatus; and
   an additional registration portion to additionally store the registered user information sent from the another image processing apparatus to the registered user information storage portion in the image processing apparatus in response to reception of the registered user information.

7. The image processing apparatus of claim 6, further comprising:
   a delete instruction portion to give an instruction of deletion of the registered user information including the registered user identification information, to the image processing apparatus identified by apparatus identification information associated with the inputted user identification information, when the inputted user identification information of the user data is stored in the user data storage portion.

8. The image processing apparatus of claim 7, further comprising:
a delete allowance portion to allow an instruction of deletion of the registered user information by the delete instruction portion.

9. The image processing apparatus of claim 6, further comprising:

an extracting portion to extract user data including the inputted user identification information from the user data storage portion in response to acceptance of the input of the user identification information at the user identification information input portion.

10. The image processing apparatus of claim 9, further comprising:
an alert portion to alert a user before deletion of the extracted user data including the inputted user identification information.

* * * * *